US007415425B1

(12) United States Patent
Walker et al.

(10) Patent No.: US 7,415,425 B1
(45) Date of Patent: Aug. 19, 2008

(54) SYSTEMS AND METHODS WHEREIN A SECURITY DEPOSIT FACILITATES A TRANSACTION IN WHICH A BENEFIT IS APPLIED IN EXCHANGE FOR PERFORMANCE OF A TASK

(75) Inventors: Jay S. Walker, Ridgefield, CT (US); Daniel E. Tedesco, Westport, CT (US); Michiko Kobayashi, Stamford, CT (US); Andrew P. Golden, Stamford, CT (US); Scott B. Allison, Stamford, CT (US); Geoffrey M. Gelman, Stamford, CT (US); Timothy A. Palmer, Stamford, CT (US); James A. Jorasch, Stamford, CT (US); Elizabeth Delamater, Lane Scott AFB, IL (US)

(73) Assignee: Walker Digital, LLC, Stamford, CT (US)

( * ) Notice: Subject to any disclaimer, the term of this patent is extended or adjusted under 35 U.S.C. 154(b) by 1126 days.

(21) Appl. No.: 09/685,079

(22) Filed: Oct. 6, 2000

Related U.S. Application Data

(60) Provisional application No. 60/208,731, filed on Jun. 2, 2000.

(51) Int. Cl.
*G07G 1/00* (2006.01)
*G07G 1/14* (2006.01)

(52) U.S. Cl. ............................ 705/14; 705/26; 705/16; 705/17; 705/27; 707/104

(58) Field of Classification Search .................. 705/26, 705/14, 16, 17, 27; 235/381; 707/104
See application file for complete search history.

(56) References Cited

U.S. PATENT DOCUMENTS

| 4,341,951 A | | 7/1982 | Benton |
| 4,554,446 A | | 11/1985 | Murphy et al. |
| 4,750,119 A | | 6/1988 | Cohen et al. ................. 364/401 |
| 4,799,156 A | * | 1/1989 | Shavit et al. .................. 705/26 |

(Continued)

FOREIGN PATENT DOCUMENTS

DE 19508388 A1 * 9/1998

(Continued)

OTHER PUBLICATIONS

PR Newswire, Jul. 26, 1999, Best Buy Makes PC/Internet Office Easier and Instant.*

(Continued)

*Primary Examiner*—F. Zeender
*Assistant Examiner*—Luna Champagne
(74) *Attorney, Agent, or Firm*—Walker Digital Management, LLC

(57) ABSTRACT

Systems and methods are provided wherein a security deposit is used to facilitate a transaction with a customer. It is arranged for a benefit to be applied to the transaction in exchange for a future performance of a task by the customer. For example, a subsidy provider may offer to apply a subsidy amount to the transaction in exchange for a future performance of the task by the customer. It is also arranged for the customer to provide a security deposit. Based on the performance of the task by the customer, it is arranged for the security deposit to be returned to the customer.

37 Claims, 21 Drawing Sheets

U.S. PATENT DOCUMENTS

| | | | |
|---|---|---|---|
| 4,839,505 A * | 6/1989 | Bradt et al. | 235/381 |
| 4,882,675 A | 11/1989 | Nichtberger et al. | |
| 4,947,028 A | 8/1990 | Gorog | |
| 4,949,256 A | 8/1990 | Humble | 364/401 |
| 4,992,940 A | 2/1991 | Dworkin | |
| 5,025,372 A | 6/1991 | Burton et al. | 364/406 |
| 5,056,019 A | 10/1991 | Schultz et al. | 364/405 |
| 5,200,889 A | 4/1993 | Mori | 364/401 |
| 5,202,826 A | 4/1993 | McCarthy | 364/405 |
| 5,253,165 A | 10/1993 | Leiseca et al. | |
| 5,256,863 A | 10/1993 | Ferguson et al. | |
| 5,287,268 A | 2/1994 | McCarthy | 705/14 |
| 5,319,542 A | 6/1994 | King, Jr. et al. | |
| 5,426,281 A | 6/1995 | Abecassis | 235/379 |
| 5,434,394 A | 7/1995 | Roach et al. | |
| 5,515,270 A | 5/1996 | Weinblatt | 705/14 |
| 5,537,314 A | 7/1996 | Kanter | 364/406 |
| 5,557,721 A | 9/1996 | Fite et al. | |
| 5,611,051 A | 3/1997 | Pirelli | |
| 5,612,527 A | 3/1997 | Ovadia | |
| 5,636,346 A | 6/1997 | Saxe | 705/1 |
| 5,666,649 A | 9/1997 | Dent | 455/445 |
| 5,673,317 A | 9/1997 | Cooper | 380/23 |
| 5,710,886 A | 1/1998 | Christensen et al. | |
| 5,717,860 A | 2/1998 | Graber et al. | 709/227 |
| 5,721,827 A | 2/1998 | Logan et al. | 709/217 |
| 5,729,693 A | 3/1998 | Holda-Fleck | 395/214 |
| 5,739,512 A | 4/1998 | Tognazzini | |
| 5,758,328 A | 5/1998 | Giovanoli | |
| 5,774,868 A | 6/1998 | Cragun et al. | 705/10 |
| 5,774,870 A | 6/1998 | Storey | 705/14 |
| 5,806,044 A | 9/1998 | Powell | |
| 5,806,045 A | 9/1998 | Biorge et al. | 705/14 |
| 5,809,144 A | 9/1998 | Sirbu et al. | |
| 5,819,029 A | 10/1998 | Edwards et al. | 395/186 |
| 5,819,234 A * | 10/1998 | Slavin et al. | 340/10.4 |
| 5,822,736 A | 10/1998 | Hartman et al. | |
| 5,832,457 A | 11/1998 | O'Brien et al. | |
| 5,842,178 A | 11/1998 | Giovannoli | |
| 5,845,259 A | 12/1998 | West et al. | |
| 5,848,396 A | 12/1998 | Gerace | 705/10 |
| 5,855,008 A | 12/1998 | Goldhaber et al. | 705/14 |
| 5,857,175 A | 1/1999 | Day et al. | |
| 5,870,459 A * | 2/1999 | Phillips et al. | 455/409 |
| 5,878,139 A | 3/1999 | Rosen | |
| 5,878,400 A | 3/1999 | Carter, III | 705/20 |
| 5,878,401 A | 3/1999 | Joseph | |
| 5,883,810 A | 3/1999 | Franklin et al. | |
| 5,887,271 A | 3/1999 | Powell | |
| 5,890,136 A | 3/1999 | Kipp | |
| 5,907,830 A | 5/1999 | Engel et al. | |
| 5,923,016 A | 7/1999 | Fredregill et al. | |
| 5,924,078 A | 7/1999 | Naftzger | 705/16 |
| 5,924,080 A | 7/1999 | Johnson | |
| 5,966,654 A * | 10/1999 | Croughwell et al. | 455/414.1 |
| 5,970,469 A | 10/1999 | Scroggie et al. | |
| 5,983,196 A | 11/1999 | Wendkos | 705/14 |
| 5,991,376 A | 11/1999 | Hennessy | 379/114 |
| 5,995,942 A | 11/1999 | Smith et al. | 705/14 |
| 6,009,411 A | 12/1999 | Kepecs | 705/14 |
| 6,014,634 A | 1/2000 | Scroggie et al. | |
| 6,017,157 A | 1/2000 | Garfinkle et al. | |
| 6,029,141 A | 2/2000 | Bezos et al. | |
| 6,035,284 A | 3/2000 | Straub et al. | |
| 6,049,778 A | 4/2000 | Walker et al. | 705/14 |
| 6,052,730 A | 4/2000 | Felciano et al. | 709/225 |
| 6,055,513 A | 4/2000 | Katz et al. | 705/26 |
| 6,061,660 A | 5/2000 | Eggleston et al. | 705/14 |
| 6,085,168 A | 7/2000 | Mori et al. | |
| 6,119,099 A | 9/2000 | Walker et al. | |
| 6,193,154 B1 | 2/2001 | Phillips et al. | |
| 6,206,165 B1 * | 3/2001 | Lenander | 194/213 |
| 6,249,772 B1 | 6/2001 | Walker et al. | |
| 6,260,024 B1 | 7/2001 | Shkedy | 705/37 |
| 6,266,651 B1 | 7/2001 | Woolston | |
| 6,336,099 B1 | 1/2002 | Barnett et al. | 705/14 |
| 6,370,513 B1 | 4/2002 | Kolawa et al. | |
| 6,393,407 B1 | 5/2002 | Middleton et al. | 705/14 |
| 6,415,262 B1 * | 7/2002 | Walker et al. | 705/14 |
| 6,512,570 B2 | 1/2003 | Garfinkle et al. | |
| 6,578,011 B1 * | 6/2003 | Forward | 705/14 |
| 6,604,089 B1 | 8/2003 | Van Horn et al. | 705/26 |
| 6,965,870 B1 | 11/2005 | Petras et al. | 705/14 |
| 2001/0052445 A1 * | 12/2001 | Coyne et al. | 194/209 |
| 2002/0161670 A1 * | 10/2002 | Walker | 705/26 |
| 2004/0128233 A1 * | 7/2004 | Jarzmik | 705/38 |
| 2005/0144041 A1 * | 6/2005 | Essig et al. | 705/2 |

FOREIGN PATENT DOCUMENTS

| | | |
|---|---|---|
| JP | 10214284 | 8/1998 |
| WO | WO 92/14213 | 8/1992 |
| WO | WO 96/31848 | 10/1996 |
| WO | WO 97/16797 | 5/1997 |
| WO | WO 97/23838 | 7/1997 |
| WO | WO 98/06050 | 2/1998 |
| WO | WO 98/21713 | 5/1998 |
| WO | WO 00/11570 | 3/2000 |

OTHER PUBLICATIONS

Welcome to Columbia House Online—http://web.archive.org/web/19961224105735/www.columbiahouse.com/repl/mc/tmpls/join/i....*

Elkin, Tobi, "Promotions: MasterCard Wins Coveted On-Pack Estate In Tie-in with Microsoft" Brandweek, Sep. 14, 1998.

Watson, Stu "What's the deal with "free" trips?", Travelers' NewsStand, Dec. 14, 1998.

"Northwest Airlines, Sprint to enter into mileage partnership; consumers can earn up to 16,500 frequent flyer miles . . . "PR Newswire, Jan. 5, 1999, Section Financial News.

"About Savesmart", (http://www.savesmart.com/about/savesmart.html), Download date: Jan. 12, 1999.

"Altavista's special offer to you . . . ", Copyright 1995-98.

"The Biggest Blockbuster of all time is yours from sprint", (http://csg.sprint.com/titanic), Download date: Jan. 18, 1999.

"Share what you know, Learn what you don't", Deja.com (http:x24.deja...), Download date May 24, 1999.

"Then Free-PC Game: Lure 'em in and lock 'em up" Business Week, Information Technology, Jul. 19, 1999.

"Tiny Free PCs—Watching the "free" PC trend . . . ", (http://www.digital.com/rcfoc/19990802.htm), Download date: Aug. 3, 1999.

Poletti, Therese "Latest Twist on Free PCs—Free iMacs" Yahoo! News, Download date: Aug. 9, 1999.

"Oldsmobile Feeling "Tournament Fever" with new CBS Sportsline, MVP.COM partnership", (http://wwwgoogle.co...) Download date: Sep. 21, 2000.

"Sportsline, Olds team up for online sales drive", AdWeek; Eastern Edition, Mar. 13, 2000; vol. 41, No. 11; p. 37.

Carroll, John "Time-Sharing Prize Promises", (http://emantel.orconet.com...), Download date: May 16, 2000.

"The Problem with Time Shares", (http://www.frommers.com/soap_box/testy...), Download date: May 16, 2000.

Wild, Matthew L., "Spending It; Untying cellular from those annual contracts.", The New York Times, Mar. 15, 1998, Sunday Late Edition, Section 3; p. 10; col. 2 Money and Business/Financial Desk.

Cruz, Humberto "The Savings Game", The Cincinnati Enquirer, Aug. 31, 1998, Section: Financial, p. B16.

Naik, Gautam, "In Digital Dorm, Click on Return for Soda", The Wall Street Journal Online, undated.

Brochure: "Reaching Out In New Directions", First Data Corporation, Merchant Service, undated.

"FAQ: CSH Coke Machine Information", FAQ, May 23, 1994, vol. 1.2, (http_//www_cs_uu_nl/wais/html/na-dir/csh-coke-machine-info_html).

Website: "Groceries Online", (http://www.groceries-online.com/), Copyright 1996 Groceries Online, Inc.
Website: "Computer Science House: Projects: Drink Machine", (http://www.csh.rit.edu/proj/drink.html), download date: Jan. 29, 1998.
Fallon, James, "Safeway Puts Ordering into Customers' Palms", Executive Technology, Jan. 1999.
Website: "SaveSmart—How SaveSmart Works for Consumers", (http://www.savesmart.com/consumer/consumer_howitworks_html), download date: Jan. 17, 1999.
Website: "welcome to planet U, providers ofU-pons—Internet Coupons", (http://www.planetu.com/), download date: Mar. 16, 1999.
Lazarus, David, "E-Commerce, Japanese Style", Wired Online, (http://www.wired.com), Jun. 7, 1999.
"Wal-Mart vs. Amazon: The fight begins", Yahoo News, (http://www.yahoo.com), Jun. 9, 1999.
"Circuit City to Integrate E-Commerce With Store Shopping: Retailer's E-Superstore—www.Circuitcity.com—to Open in July", PR Newswire, Jun. 15, 1999, Section: Financial News.
Frederick, James, "Walgreens gears for opening of its own Internet pharmacy", Drug Store News, Jul. 19, 1999, vol. 9, No. 7.
"Internet Wine Gift Company Offers Answer to Recent Legislation", Source: Send.com, Aug. 10, 1999.
Pogoda, Dianne M., G.E.C.C. offers credit card with discounts, rebates;General Electric Capital Corp., WWD (Women's Wear Daily), Sep. 3, 1992, vol. 164; No. 46; p. 7.
Selasky, Susan, "Easy-to-swallow savings; Diner credit cards serve wide menu of discounts", Pittsburgh Post-Gazette, Dec. 5, 1996, Section: Food, p. F-2.
Myhre's Examiner's Affidavit, dated Dec. 22, 2003, 1 pg.
Tedesco, Richard, "Pactel Pushes 'Net Access'", Broadcasting & Cable, Jun. 3, 1996, pp. 64-65,.
Colman, Price, "Cross-Marketing Cuts Cable Bills", Broadcasting & Cable, Jul. 15, 1996, p. 44,.
Fleming et al., "European Banks, Insurance Firms Cross Into Each Other's Territory", Wall Street Journal (Europe), Feb. 20, 1991, p. 9.
Press Release of Oct. 16, 1996, "Radioshack Introduces Handheld, Flip-Style Cellular Telephone with Vibration Alert", Tandy Corporation, Copyright 1995, 2 pp.
Press Release of Aug. 21, 1996, "Fort Worth Outlet Square Offers American Airline Aadvantage Miles", Tandy Corporation, Copyright 1995, 2 pp.
Press Release of Sep. 11, 1996, "One-Stop Telephone Shopping Returns to America! Sprint, Sprint Spectrum and Radioshack Join Forces", Tandy Corporation, Copyright 1995, 2 pp.
Website: Radioshack, (www.radioshack.com/partners/Verizon/VerizonLanding.asp, printed Apr. 11, 2003, 3 pp.
Website: "buy.com", (www.buy.com/retail/w... Category=CELLULAR), copyright 1997-2003, printed Apr. 11, 2003, 2 pp.
Donlon, Brian, "Cable Industry Channels Efforts in April; sampler of specials", USA Today, McLean, VA, Mar. 29, 1990, p. 3D.
Anonymous, "Manufacturers Shine with Cross-Promotional Prowess", Discount Store News, New York, Aug. 5, 1996, vol. 35, Iss. 15, p. 19,.
Marn, M.V., "Managing Price, Gaining Profit", McKinsey Quarterly, No. 4, Autumn 1992, p. 19.
Howard, L.S., "RM Sees Outsourcing Challenge", National Underwriter Property & Casualty Risk & Benefits Management, vol. 101, No. 47, Nov. 24, 1997, p. 29.
"Shamrock Technology Co. Establishes No. American HQ as Monitor Manufacturer Continues Market Expansion", Business Wire, Mar. 25, 1997.
Poletti, T., "Latest Twist on Free PCs—Free iMACs", Yahoo! News, Aug. 3, 1996.
"'Simple, Fast and Flexible' Defines Hotel Giant's Exciting New Rewards Program, Starwood Preferred Guest", PR Newswire, Feb. 3, 1999.
Krauss, J., "Subsidized TV Sets?", Communications Engineering & Design, Feb. 1998.
Spoor, Diana, "Selling A Free Phone", Cellular Business, Feb. 1994, p. 58.

Ellis, Stephen, "Credit Card Firms Drive Down Costs", Sunday Times, Feb. 27, 1994.
Foster, Ed, "Can Mixing "cookies" With Online Marketing be a Recipe for Heartburn?", Infoworld, vol. 18, No. 30, p. 54.
Parker, Penny, "Cart Vendors Offer Line-Free Shopping", Denver Post, WED1, ED, p. D1, Dec. 20, 1995, Dialog File 387, record # 00625125.
Mr. Pigeon, "Cell Phone Hype Pigeon Family Sweats the Details", Star Tribune, Jan. 25, 1995, Dialog File 724, record # 04076233.
Crump, Stuart, "Faith Goes Cellular", Home Office Computing, vol. 12, No. 6, p. 110, Jun. 1994, dialog file 47, record # 04076233.
"Cellular Wrong Signals", Newsday, p. 39, Jul. 2, 1993.
International Search Report for Application No. PCT/US99/13409, dated Oct. 21, 1999, 2 pp.
Written Opinion for Application No. PCT/US99/13409, dated May 5, 2000, 12 pp.
Office Action for U.S. Appl. No. 09/219,267, dated May 17, 2002, 14 pp.
Office Action for U.S. Appl. No. 09/219,267, dated Dec. 21, 2001, 2 pp.
Office Action for U.S. Appl. No. 09/219,267, dated Dec. 14, 2002, 17 pp.
Office Action for U.S. Appl. No. 09/219,267, dated Jul. 18, 2002, 2 pp.
Office Action for U.S. Appl. No. 09/219,267, dated Apr. 22, 2003, 18 pp.
Office Action for U.S. Appl. No. 09/219,267, dated Jan. 9, 2004, 27 pp.
Office Action for U.S. Appl. No. 09/219,267, dated Dec. 14, 2004, 24 pp.
Office Action for U.S. Appl. No. 09/219,267, dated Mar. 6, 2006, 19 pp.
Office Action for U.S. Appl. No. 09/219,267, dated Jun. 21, 2007, 6 pp.
Office Action for U.S. Appl. No. 09/219,267, dated Sep. 7, 2007, 17 pp.
Office Action for U.S. Appl. No. 11/423,481, dated Jan. 25, 2007, 6 pp.
Office Action for U.S. Appl. No. 11/423,481, dated Jul. 24, 2007, 2 pp.
Office Action for U.S. Appl. No. 11/423,481, dated Oct. 9, 2007, 24 pp.
Office Action for U.S. Appl. No. 11/423,493, dated Jan. 26, 2007, 6 pp.
Office Action for U.S. Appl. No. 11/423,493, dated Jul. 24, 2007, 3 pp.
Office Action for U.S. Appl. No. 11/423,493, dated Oct. 18, 2007, 21 pp.
Office Action for U.S. Appl. No. 11/423,498, dated Jan. 26, 2007, 6 pp.
Office Action for U.S. Appl. No. 11/423,498, dated Jul. 24, 2007, 3 pp.
Office Action for U.S. Appl. No. 11/423,498, dated Oct. 18, 2007, 9 pp.
Office Action for U.S. Appl. No. 09/540,034, dated Jan. 14, 2003, 21 pp.
Office Action for U.S. Appl. No. 09/540,034, dated Oct. 10, 2003, 21 pp.
Decision on Appeal for U.S. Appl. No. 09/540,034, dated May 16, 2007.
Office Action for U.S. Appl. No. 09/322,351, dated Oct. 12, 2000, 33 pp.
Office Action for U.S. Appl. No. 09/322,351, dated Jan. 18, 2001, 29 pp.
Office Action for U.S. Appl. No. 09/322,351, dated Sep. 25, 2001, 21 pp.
Office Action for U.S. Appl. No. 09/322,351, dated May 2, 2002, 22 pp.
Interview Summary for U.S. Appl. No. 09/322,351, dated May 2, 2002, 5 pp.
Office Action for U.S. Appl. No. 09/322,351, dated Jan. 27, 2003, 27 pp.

Office Action for U.S. Appl. No. 09/322,351, dated May 21, 2004, 19 pp.
Office Action for U.S. Appl. No. 09/322,351, dated Nov. 9, 2004, 21 pp.
Office Action for U.S. Appl. No. 09/322,351, dated Mar. 13, 2006, 19 pp.
Office Action for U.S. Appl. No. 09/322,351, dated Nov. 30, 2006,.
Office Action for U.S. Appl. No. 09/322,351, dated Aug. 20, 2007, 25 pp.
Written Opinon for Application No. PCT/US99/30504, dated Dec. 22, 2000, 14 pp.
Office Action for U.S. Appl. No. 09/274,281, dated Aug. 8, 2001, 4 pp.
Office Action for U.S. Appl. No. 09/274,281, dated Apr. 12, 2002, 9 pp.
Office Action for U.S. Appl. No. 09/274,281, dated May 13, 2002, 3 pp.
Office Action for U.S. Appl. No. 09/274,281, dated Jan. 13, 2003, 3 pp.
Office Action for U.S. Appl. No. 09/274,281, dated Apr. 10, 2003, 7 pp.
Office Action for U.S. Appl. No. 09/274,281, dated Jun. 28, 2004, 3 pp.
Office Action for U.S. Appl. No. 09/274,281, dated Jul. 27, 2005, 9 pp.
Restriction for U.S. Appl. No. 09/274,281, dated Mar. 16, 2007, 4 pp.
Office Action for U.S. Appl. No. 09/274,281, dated Jun. 29, 2007, 5 pp.
Interview Summary for U.S. Appl. No. 09/274,281, dated Aug. 1, 2007, 2 pp.
International Search Report for Application No. PCT/US99/13819, dated Oct. 21, 1999, 7 pp.
Written Opinion for Application No. PCT/US99/13819, dated May 16, 2000, 5 pp.
Office Action for U.S. Appl. No. 09/282,747, dated Oct. 13, 2000, 34 pp.
Office Action for U.S. Appl. No. 09/282,747, dated May 21, 2001, 43 pp.
Office Action for U.S. Appl. No. 09/282,474, dated Mar. 1, 2002, 20 pp.
Interview Summary for U.S. Appl. No. 09/282,747, dated Jul. 17, 2002, 2 pp.
Office Action for U.S. Appl. No. 09/282,747, dated Nov. 19, 2002, 18 pp.
Office Action for U.S. Appl. No. 09/282,747, dated Apr. 13, 2004, 17 pp.
Office Action for U.S. Appl. No. 09//282,747, dated Dec. 7, 2004, 25 pp.
Office Action for U.S. Appl. No. 09/282,747, dated Mar. 21, 2006, 22 pp.
Office Action for U.S. Appl. No. 09/282,747, dated Feb. 27, 2007, 25 pp.
Interview Summary for U.S. App. No. 09/282,747, dated Jun. 21, 2007, 3 pp.
Office Action for U.S. Appl. No. 09/282,747, dated Sep. 7, 2007, 23 pp.
International Search Report for Application No. PCT/US99/19955, dated Feb. 23, 2000.
Written Opinion for Application No. PCT/US99/19955, dated Apr. 5, 2001, 15 pp.
Office Action for U.S. Appl. No. 09/579,215, dated Jul. 29, 2003, 19 pp.
Office Action for U.S. Appl. No. 09/579,215, dated Apr. 7, 2004, 31 pp.
Office Action for U.S. Appl. No. 09/579,215, dated Dec. 17, 2004, 20 pp.
Office Action for U.S. Appl. No. 09/579,215, dated Mar. 6, 2006, 19 pp.
Office Action for U.S. Appl. No. 09/579,215, dated Jul. 12, 2007, 18 pp.
International Search Report for Application No. PCT/US00/18474, dated May 31, 2002, 1 pg.
PCT International Preliminary Examination Report for Application No. PCT/US00/18474, dated Jun. 18, 2001.
Office Action (Canadian) for Canadian Application No. 2373367, dated Mar. 17, 2004.
International Search Report for Application No. PCT/US99/21720, dated Mar. 23, 2003, 6 pp.
Blattberg, Robert C. and Levin, Alan, "Modelling the Effectiveness and Profitability of Trade Promotions", The Institute of Management Sciences/Operations Research Society of America, 1987, provided by the British Library.

* cited by examiner

| CUSTOMER IDENTIFIER 602 | NAME 604 | CONTACT INFORMATION 606 | PAYMENT IDENTIFIER 608 |
| --- | --- | --- | --- |
| C-1-2345234 | JENNIFER JAMES | 32 GARDEN ROW BELLTOWN, USA | 1234-1244-2345-3456 (CREDIT CARD) |
| C-2-2345234 | MICHAEL SMITH | TROLL@BRIDGE.COM | 3458-0239-0283-0293 (DEBIT CARD) |
| C-3-2345234 | DAVID STONE | (333)555-3333 | BGG@PAY.COM |
| C-4-2345234 | SUSAN PETERS | (478)555-2890 | 0982-3245-7642-8933 (CREDIT CARD) |
| C-5-2345234 | KEVIN WRIGHT | SDI93K@AOL.COM | BANK ACCOUNT NUMBER |

| TASK IDENTIFIER 702 | DESCRIPTION OF TASK 704 | SUBSIDY PROVIDER 706 | BENEFIT FOR PERFORMING TASK 708 | SECURITY DEPOSIT 710 |
|---|---|---|---|---|
| TASK-1-093824 | TEST DRIVE A CAR | LARRY'S CAR DEALERSHIP | FREE GROCERIES (UP TO $50) | $25 |
| TASK-2-093824 | FILL OUT TEN SURVEYS OVER THE NEXT TEN WEEKS | MARKETING INTERNATIONAL | 50 HALF-PRICE TOKENS | $20 |
| TASK-3-093824 | REFER FIVE FRIENDS | PYRAMID, INC. | 10% DISCOUNT ON PURCHASE | VALUE OF DISCOUNT |
| TASK-4-093824 | SELL AN ITEM THROUGH EBAY.COM | EBAY.COM® | $5 OFF ORDER OF $5 OR MORE | $5 |
| TASK-5-093824 | ATTEND A REAL ESTATE PRESENTATION | CENTURY 21® | FREE SUBSCRIPTION TO MAD MAGAZINE | 10 TOKENS |

FIG. 7

| REBATE CERTIFICATE IDENTIFIER 802 | CUSTOMER IDENTIFIER 804 | TASK IDENTIFIER 806 | TASK DEADLINE 808 | TASK STATUS 810 |
|---|---|---|---|---|
| RC-1-FROG-234 | C-1-2345234 | TASK-1-093824 | 8/16/00 | COMPLETE |
| RC-2-DUCK-534 | C-2-2345234 | TASK-2-093824 | 6/30/00 | PENDING |
| RC-3-PIG-752 | C-3-2345234 | TASK-1-093824 | 7/4/00 | OVERDUE |
| RC-4-DOG-209 | C-4-2345234 | TASK-4-093824 | 8/15/00 | COMPLETE |
| RC-5-CAT-275 | C-5-2345234 | TASK-5-093824 | 10/10/00 | PENDING |

| REBATE CODE 902 | SUBSIDY PROVIDER 904 |
|---|---|
| CODE-1-031415 | LARRY'S CAR DEALERSHIP |
| CODE-2-031415 | MARKETING INTERNATIONAL |
| CODE-3-031415 | PYRAMID, INC. |
| CODE-4-031415 | EBAY.COM® |
| CODE-5-031415 | CENTURY 21® |

SYSTEMS AND METHODS WHEREIN A SECURITY DEPOSIT FACILITATES A TRANSACTION IN WHICH A BENEFIT IS APPLIED IN EXCHANGE FOR PERFORMANCE OF A TASK

CROSS REFERENCE TO RELATED APPLICATIONS

The present application claims the benefit of (i) U.S. Provisional Application Ser. No. 60/208,731 entitled "WEBHOUSE® Rebate Certificates" filed Jun. 2, 2000; and (ii) U.S. patent application Ser. No. 09/221,457, entitled "METHOD AND APPARATUS FOR DETERMINING A SUBSCRIPTION TO A PRODUCT IN A RETAIL ENVIRONMENT", filed on Dec. 28, 1998, and issued as U.S. Pat. No. 6,415,262 on Jul. 2, 2002, which itself is a continuation-in-part of and claims priority to U.S. patent application Ser. No. 08/889,589, entitled "SYSTEM AND METHOD FOR ESTABLISHING AND MANAGING SUBSCRIPTION PURCHASE AGREEMENTS INCLUDING COMMITMENTS TO PURCHASE GOODS OVER TIME AT AGREED UPON PRICES", filed on Jul. 8, 1997, and issued as U.S. Pat. No. 5,970,470 on Oct. 19, 1999. The entire contents of each of these applications being hereby incorporated by reference herein.

The present application is related to: U.S. patent application Ser. No. 09/337,906 entitled "Purchasing Systems and Methods Wherein a Buyer Takes Possession at a Retailer of a Product Purchased Using a Communication Network," and filed Jun. 22, 1999, which is a continuation-in-part of U.S. patent application Ser. No. 08/889,503 entitled "System and Process for Local Acquisition of Products Priced Online" and filed Jul. 8, 1997; U.S. patent application Ser. No. 09/219,267 entitled "Method and Apparatus for Facilitating Electronic Commerce Through Providing Cross-Benefits During a Transaction" and filed Dec. 23, 1998; U.S. patent application Ser. No. 09/282,747 entitled "Method and Apparatus for Providing Cross-Benefits Based on a Customer Activity" and filed Mar. 31, 1999; U.S. patent application Ser. No. 09/274,281 entitled "Method and Apparatus for Providing Cross-Benefits via a Central Authority" and filed Mar. 22, 1999; U.S. patent application Ser. No. 09/322,351 entitled "Method and Apparatus for Providing Cross Benefits and Penalties" and filed May 28, 1999; U.S. patent application Ser. No. 09/504,180 entitled "Systems and Methods Using a Representation of a Stored Benefit To Facilitate a Transaction" and filed Feb. 15, 2000; U.S. patent application Ser. No. 08/932,984 entitled "System and Method for Issuing Security Deposit Guarantees Based on Credit Card Accounts" and filed Sep. 18, 1997; and U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers" filed on Sep. 4, 1996 and issued as U.S. Pat. No. 5,794,207 on Aug. 11, 1998. The entire contents of these application are incorporated herein by reference.

FIELD

The present invention relates to commerce. In particular, the present invention relates to systems and methods wherein a security deposit is used to facilitate a transaction.

BACKGROUND

Typically, a buyer visits one or more retail stores to shop for a product. When the buyer finds the product he or she is looking for, at a reasonable price, the buyer purchases the product from the retail store. This traditional method, however, may require that the buyer visit a number of retail stores to determine a reasonable price for the product. Moreover, a retail store must attract buyers, such as by spending money on advertising. For example, when a new retail store opens for business, many buyers will not know what types of products are sold by the retail store. In addition, the traditional method does not let a party other than the retail store, such as a product manufacturer, establish a pricing relationship directly with a buyer. For example, a manufacturer may sell a product to a retail store (perhaps through a distributor) that ultimately determines the price at which the product is sold to a buyer.

Recently, products have been sold to buyers via communication networks such as the Internet (e.g., via an online Web merchant). Internet sales have been growing steadily over the past few years, and are expected to increase, because buyers are attracted to the ease and convenience of shopping online. For example, a buyer can shop online from the comfort of home and receive information from a number of Web merchants to determine a reasonable price for a product.

The sale of products from Web merchants to buyers, however, has a number of disadvantages. For example, in a typical sale via the Internet, a traditional retail store (e.g., a retail store which is not online) is typically left completely out of the transaction. In addition to losing a potential profit from the sale of the product itself, such a retail store loses the chance to sell additional products to the buyer, such as product accessories (e.g., batteries). Moreover, the retail store cannot sell unrelated products that attract the buyer's attention while he or she is in the store. This may still be a problem even if the retail store invested the time and money required to establish an online service. Moreover, a retail store's online service may simply shift sales that would have otherwise occurred at the actual store (as opposed to attracting new buyers).

U.S. patent application Ser. No. 09/337,906 filed Jun. 22, 1999 and entitled "Purchasing Systems and Methods Wherein a Buyer Takes Possession at a Retailer of a Product Purchased Using a Communication Network" describes systems wherein a buyer takes possession of a product at a retailer. The purchasing system communicates with a buyer through a communication network to establish a first price for a product between the buyer and a seller. For example, the purchasing system may evaluate a buyer offer, including an offer price, related to the product. If the buyer offer is acceptable, the purchasing system arranges for the buyer to take possession of the product at a retailer, different from the seller, that offers the product for sale at a second price. The buyer provides a payment, based on the first price, to the purchasing system in exchange for the right to take possession of the product at the retailer.

No matter what type of system is used to sell a product, some buyers may not be willing, or able, to pay a retail price for the product (e.g., a merchant's retail price). One way to address this problem is to reduce the retail price associated with the product. Unfortunately, reducing the retail price also reduces any profit from the sale of the product, and the reduced profit may not be offset by any increase in the number of products that are sold.

Instead of simply reducing the retail price, a merchant (or manufacturer) may distribute coupons that discount the price associated with the product. This also reduces any profit with respect to those transactions in which a coupon is redeemed. Moreover, the discount associated with a coupon is traditionally revealed to buyers, preventing the discount from being adjusted as appropriate (e.g., by increasing the discount if the coupon is not generating sales or by adjusting the discount based on information associated with a particular buyer). In addition, the value of a coupon is generally determined when the coupon is provided to a buyer, and not when the buyer redeems the coupon. This also prevents the discount from being adjusted as may be appropriate (e.g., based on supply, demand or any other information at the time of redemption).

Instead of reducing the price associated with a product, it is also known that a merchant can offer a promotion to encourage a buyer to purchase a product. For example, a merchant may advertise a "buy one get one free" promotion or provide a discount to buyers who establish a credit card account associated with the merchant. Similarly, a number of merchants can work together to offer a promotion. For example, a first merchant may advertise that if a buyer purchases a first product from the first merchant, a second product can be purchased at a reduced price from, or be given away by, a second merchant.

U.S. patent application Ser. No. 09/219,267 filed Dec. 23, 1998 and entitled "Method and Apparatus for Facilitating Electronic Commerce Through Providing Cross-Benefits During a Transaction" describes systems wherein a merchant server of a first merchant receives an indication of products that a buyer is to purchase via a Web site. In response, the merchant server provides an offer for a benefit from a second merchant, such as by providing a cross-benefit or subsidy offer. If the buyer indicates acceptance of the subsidy offer, the benefit is applied to the product or products being purchased. In exchange, the buyer agrees to participate in a transaction with the second merchant.

However, the buyer may not actually participate in the transaction with the second merchant as he or she agreed. For example, the customer may forget to participate in the transaction or later change his or her mind about the agreement. In this case, the first merchant may want to recover the benefit that was applied to the product or products being purchased. However, the first merchant may not be able to locate the customer or may be otherwise unable to recover the benefit from the customer.

SUMMARY

To alleviate problems inherent in the prior art, the present invention introduces systems and methods using a security deposit to facilitate a transaction.

According to one embodiment of the present invention, it is arranged for a benefit to be applied to a transaction in exchange for a future performance of a task by a customer. The customer provides a security deposit, and the security deposit is returned to the customer based on the performance of the task.

According to another embodiment, an indication is received that a customer is interested in purchasing an item from a merchant. Based on the received indication, an offer is transmitted to the customer. The offer is to apply a benefit, provided by a subsidy provider, to the transaction in exchange for a future performance of a task by the customer. A payment identifier is received from the customer, and it is arranged for the customer to provide payment of a security deposit using the payment identifier. The performance of the task by the customer is verified, and the security deposit is returned to the customer based on the performance of the task.

According to another embodiment, a security deposit is received from a customer, and a subsidy amount is applied to a transaction in exchange for a future performance of a task by the customer. Security deposit information is transmitted, the security deposit information enabling the customer to receive the security deposit upon performance of the task.

According to another embodiment, a benefit is applied to a transaction in exchange for a future performance of a task by a customer, the benefit being supplied by a subsidy provider. It is arranged for the customer to provide a security deposit, and compensation is received in exchange for facilitating the transaction.

According to another embodiment, a customer arranges to have a benefit applied to a transaction in exchange for a future performance of a task. A security deposit is provided (e.g., to a merchant), and the security deposit is returned based on the performance of the task.

One embodiment of the present invention comprises: means for arranging for a benefit to be applied to a transaction in exchange for a future performance of a task by a customer; means for arranging for the customer to provide a security deposit; and means for arranging for the security deposit to be returned to the customer based on the performance of the task.

With these and other advantages and features of the invention that will become hereinafter apparent, the nature of the invention may be more clearly understood by reference to the following detailed description of the invention, the appended claims and the several drawings attached herein.

BRIEF DESCRIPTION OF THE DRAWINGS

FIG. 6 is a tabular representation of a portion of a buyer database according to an embodiment of the present invention.

FIG. 7 is a tabular representation of a portion of a task database according to an embodiment of the present invention.

FIG. 8 is a tabular representation of a portion of a rebate certificate database according to an embodiment of the present invention.

FIG. 9 is a tabular representation of a portion of a rebate code database according to an embodiment of the present invention.

DETAILED DESCRIPTION

The present invention is directed to systems and methods wherein a security deposit is used to facilitate a transaction, such as a transaction in which a customer purchases an "item" from a merchant. As used herein, an item refers to anything that can be purchased or sold by a customer (e.g., a product and/or a service). Airline tickets, consumer electronics, information delivered via a communication network, technical support service, and grocery products are some examples of items that can be purchased by a customer. Note that a customer may instead purchase an interest in an item (e.g., a customer may lease a product from a merchant). Moreover, as used herein, a "customer" or a "merchant" can be any party (e.g., an individual or a company) that exchanges an item or an interest in an item.

Figure 1:
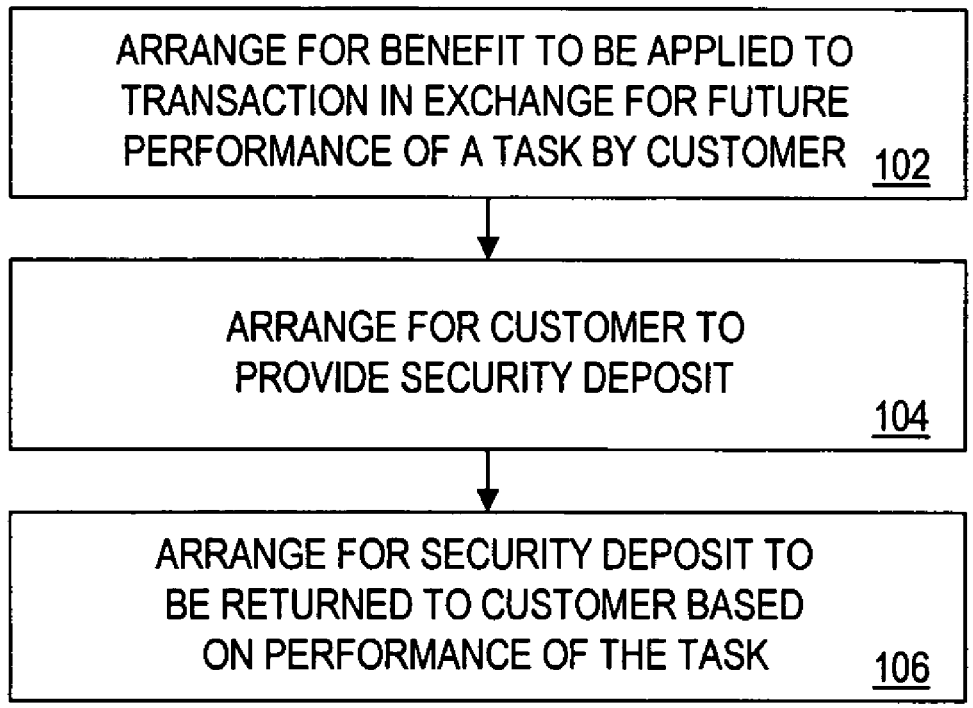
FIG. 1 is a flow chart of a transaction method according to an embodiment of the present invention.

Turning now in detail to the drawings, FIG. 1 is a flow chart of a transaction method according to an embodiment of the present invention. At 102, it is arranged for a benefit to be applied to a transaction in exchange for a future performance of a task by a customer. For example, the customer may indicate to a merchant that he or she is interested in purchasing a product (e.g., by bringing the product to a point of sale terminal). The merchant may then offer to provide the item to the customer at a reduced price if the customer agrees to test drive a particular automobile within thirty days.

The merchant may make such an offer, for example, because an automobile manufacturer had previously agreed to provide a payment for each customer who test drives that automobile. Note that the payment provided by the automobile manufacturer may be less than the amount the price was reduced (i.e., the merchant is partially funding the reduction in price for the customer), equal to the amount the price was reduced, or more than the amount the price was reduced (i.e., the merchant will actually increase an amount of profit associated with the transaction despite the reduction in price). Also note that, according to one embodiment, the task performed by the customer is associated with a party other than the merchant (e.g., the task may be associated with a third party subsidy provider or both the merchant and the third party subsidy provider).

According to an embodiment of the present invention, it is arranged for the customer to provide a security deposit at 104. For example, the customer may provide a payment of a security deposit amount to the merchant.

At 106, it is arranged for the security deposit to be returned to the customer based on the performance of the task. For example, an automobile dealership may return the security deposit amount to the customer after he or she test drives the automobile.

Figure 2A:
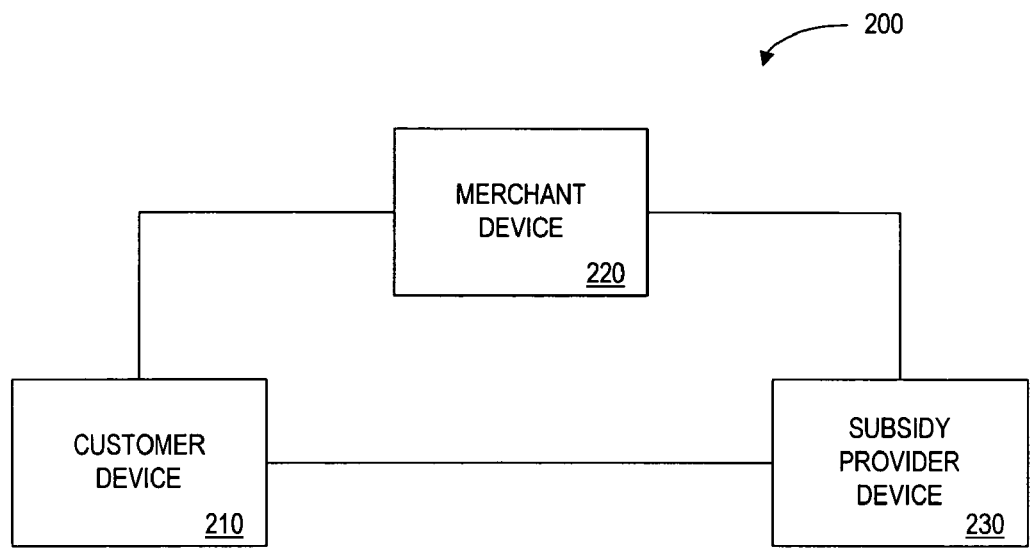
FIG. 2A is a block diagram overview of a transaction system according to an embodiment of the present invention.
Figure 2B:
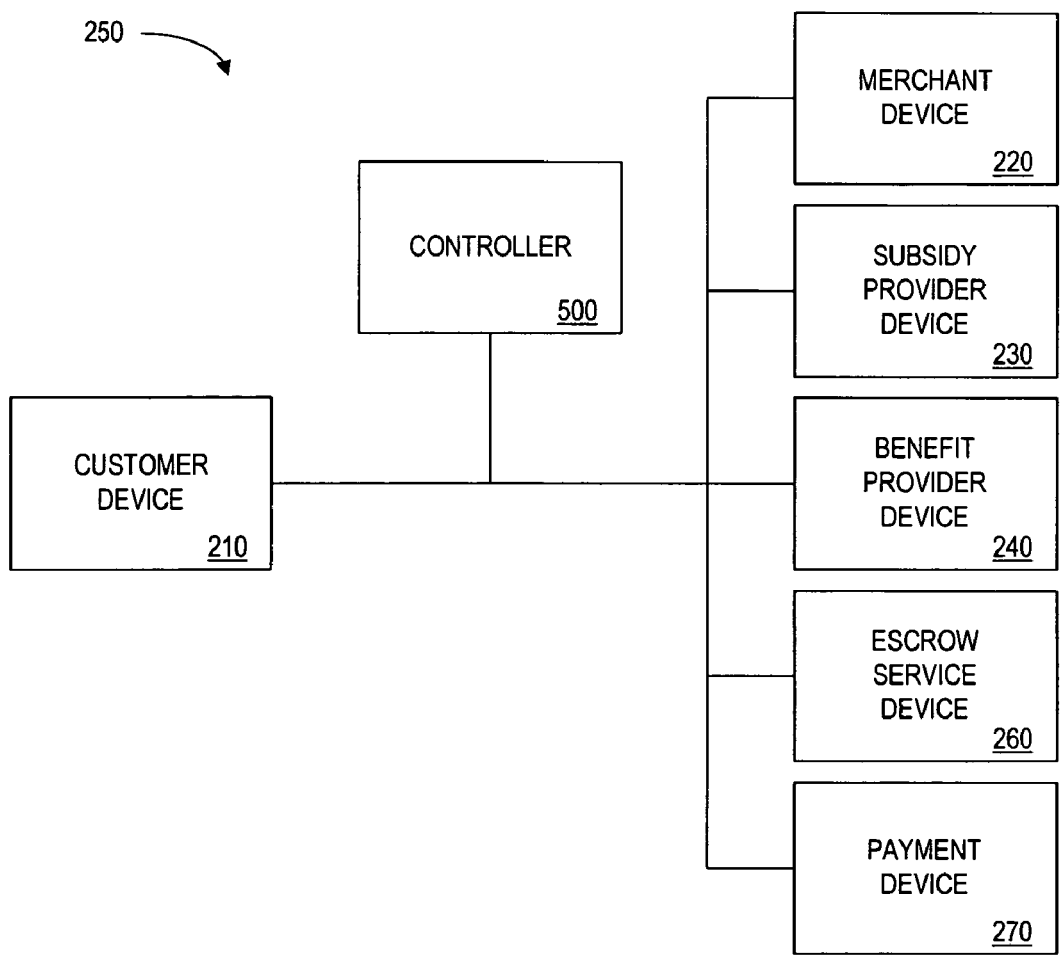
FIG. 2B is a block diagram overview of a transaction system according to another embodiment of the present invention.

A more detailed description of embodiments of the present invention will now be provided with respect to the transaction systems shown in FIGS. 2A and 2B.

Transaction Systems

Turning now in detail to the drawings, FIG. 2A is a block diagram overview of a transaction system 200 according to one embodiment of the present invention. The transaction system 200 includes a customer device 210 in communication with a merchant device 220. As used herein, a device (including the customer device 210, the merchant device 220, and a subsidy provider device 230) may communicate, for example, through a communication network such as a Local Area Network (LAN), a Wide Area Network (WAN), a Metropolitan Area Network (MAN), a Public Switched Telephone Network (PSTN), or an Internet Protocol (IP) network such as the Internet, an intranet or an extranet. Moreover, as used herein, a communication network includes those enabled by wired or wireless technology.

The merchant device 220 is also in communication with a subsidy provider device 230. Note that the devices shown in FIG. 2A may not be in constant communication. For example, the customer device 210 may only communicate (i) with the merchant device 220 via the Internet when attached to a "docking" station or "cradle" or otherwise in communication with another device such as a Personal Computer (PC) and (ii) with the subsidy provider device 230 via an Infra Red (IR) port when near a subsidy provider kiosk.

In one embodiment of the present invention, the customer device 210 communicates with a remote Web-based merchant device 220 (e.g., a server) via the Internet. Although embodiments of the present invention will be described with respect to information exchanged using a Web site, according to other embodiments of the present invention information can be exchanged using, for example, a wired or wireless telephone, an Interactive Voice Response Unit (IVRU), a facsimile machine, postal mail, electronic mail, a WEBTV® interface, a cable network interface, a wireless device, a kiosk, a shopping cart device, and/or a Point Of Sale (POS) terminal.

The customer device 210 may be, for example, a PC, a portable computing device such as a Personal Digital Assistant (PDA), a wired or wireless telephone, a one-way or two-way pager, a kiosk, an Automated Teller Machine (ATM), and/or any other appropriate communication device. Note that the merchant device 220 may communicate with a number of customer devices 210 of different types (e.g., some customers may use PDAs while others use kiosks).

In general, the devices shown in FIG. 2A may be any devices capable of performing methods in accordance with the present invention. Note that any of the customer device 210, the merchant device 220, and/or the subsidy provider device 230 may be incorporated in a single device (e.g., a kiosk located in the merchant's store may serve as both the customer device 210 and the merchant device 220).

As will be explained, the transaction system 200 may be used to facilitate a transaction in which a customer purchases an item from a merchant. According to another embodiment, the transaction system 200 facilitates a transaction in which a customer sells an item (e.g., to a merchant or to another customer).

According to an embodiment of the present invention, the merchant device 220 arranges for a benefit to be applied to the customer's transaction in exchange for a future performance of a task by the customer, such as a task associated with a subsidy provider.

The "benefit" applied to the transaction may comprise, for example, a reduction in an amount of payment provided by the customer. For example, a customer may receive an item in exchange for providing payment of fifty percent of (or ten dollars less than) a retail price associated with the item. According to another embodiment, the benefit may comprise a supplemental item (e.g., a peripheral device) or a substitute item (e.g., a higher quality item) received by the customer. The benefit may also comprise a payment of an alternate currency to the customer (e.g., a gift certificate or an award of frequent flier miles). According to another embodiment, the benefit comprises an improved transaction term (e.g., an extended warranty or an improved interest rate). When the transaction involves a customer selling a product or a service, the benefit may comprise an increased amount of payment received by the customer.

According to another embodiment, the benefit comprises an increased amount associated with an offer provided by a customer. For example, a customer who submits a bid to purchase an item via an online auction Web site may have his or her bid increased. According to still another embodiment, the benefit comprises an increased probability associated with the transaction. For example, a customer who has a fifty percent chance of receiving an item in a transaction may receive a benefit such that he or she now has a sixty percent chance of receiving the item.

Note that the benefit may be applied by, for example, the merchant or the subsidy provider. According to some embodiments, the benefit is applied to another transaction (e.g., a subsequent transaction) and/or another customer (e.g., a friend or family member).

According to one embodiment of the present invention, the same predetermined benefit is applied to all transactions. According to another embodiment, a benefit to be applied to the transaction is determined (e.g., by the merchant device 220 or the subsidy provider device 230). The benefit may be based on, for example, information associated with the transaction (e.g., the benefit may be based on a time of day associated with the transaction). The benefit may also be based on information associated with the customer, such as whether he or she is a new customer or a customer who has performed tasks in the past. The benefit may also be based on information associated with the task or information associated with an item purchased by the customer. For example, the benefit may be based on an item price (e.g., a retail price or a cost associated with the item) or an item category (e.g., whether the item is a software program or an airline ticket). The benefit may also be based on information associated with the merchant or the subsidy provider (e.g., a current customer acquisition rate). According to another embodiment of the present invention, a customer may use his or her customer device 210 to request a particular benefit.

According to one embodiment of the present invention, the merchant device 220 arranges for the benefit to be applied to the transaction by transmitting to the customer device 210 an offer to apply the benefit to the transaction in exchange for the future performance of the task by the customer. In this case, the customer may use his or her customer device 210 to transmit a response to the offer to the merchant device 220.

Such an offer to apply a benefit may be transmitted by the merchant device 220 in response to an indication that the customer is interested in purchasing an item. For example, the indication may comprise an order for the item (e.g., an order received at a POS terminal or via a Web site) or an indication that the item is in a real or virtual shopping cart associated with the customer. According to another embodiment, the indication comprises an indication that the customer is accessing information about the item. Other indications that a customer may be interested in purchasing an item may include, for example, the merchant device 220 receiving: information stored at the customer device 210, an indication from an input device associated with the customer, an indication that the customer is viewing information about the item, an indication that the customer has viewed information about the item for a predetermined period of time, an indication that the customer is providing payment for the item (e.g., using his or her credit card), a search term (e.g., submitted to an Internet search engine), a price request, an indication that the customer is no longer interested in purchasing the item, an indication that the customer is not going to purchase the item at an original price, an indication that the customer is interested in purchasing another item (e.g., an item associated with a competing manufacturer), an indication that the customer is purchasing the item from another merchant, a bid for the item, an offer to purchase the item (e.g., including a customer defined price for the item), and/or an indication that another customer is also interested in purchasing the item (e.g., the other customer has submitted a higher bid for the item via an auction Web site).

Based on the customer's promise to perform the task in the future, the merchant device 220 applies the benefit to the transaction. For example, the merchant device 220 may reduce a retail price associated with the item by $10.

The "task" to be performed by the customer in the future may comprise, for example, applying for a service and/or subscribing to a service, such as a telephone service (e.g., a long distance telephone service, an Internet service, a banking service, a credit card account service, an insurance service, a securities trading service, a satellite television service, and/or a cable television service). For example, the task may comprise applying for a new credit card. In this case, a credit card company may provide, for example, a payment of $20 to the merchant in exchange for a new potential customer. According to other embodiments, the task may comprise purchasing a supplemental or substitute item, exchanging an item (e.g., providing a used computer to a computer dealer), visiting a merchant, receiving information (e.g., a telemarketing presentation), dialing a telephone number, accessing a Web page, and/or providing information (e.g., answering one or more survey or focus group questions).

According to one embodiment of the present invention, all customers are required to perform the same predetermined task. According to another embodiment, the task to be performed by the customer is determined (e.g., by the merchant device 220 or the subsidy provider device 230). The task may be based on, for example, information associated with the transaction (e.g., the task may be based on a month associated with the transaction). The task may also be based on information associated with the customer, such as whether the customer falls within a predetermined demographic profile. The task may also be based on information associated with the benefit being applied or information associated with an item purchased by the customer. For example, the task may be based on an item price or an item category. The task may also be based on information associated with the merchant or the subsidy provider. According to another embodiment of the present invention, a customer may use his or her customer device 210 to request a particular task to be performed.

According to the present invention, the merchant device 200 also arranges for the customer to provide a security deposit. As used herein, a "security deposit" may be anything provided by a customer to secure the benefit being applied to the transaction. For example, the security deposit may be a payment provided by the customer (including a payment of an alternate currency, such as frequent flier miles).

According to another embodiment, the security deposit is an item owned by the customer (or an interest in an item). For example, a customer may leave with the merchant an item (e.g., the item that he or she is purchasing). Similarly, a customer can be allowed to take possession of the item, but the item may not function (or may only partially function) until the customer performs the task. For example, a digital television may not have certain features (e.g., surround sound) until it receives a predetermined signal (e.g., a signal that is not transmitted to the television until the subsidy provider verifies that the customer has performed the task). Similarly, a merchant may transmit an encoded information file (e.g., a software program) to the customer but information required to decode the information file (e.g., a "key" or code that unlocks a software program) may only be provided after the customer has performed the task.

According to still another embodiment, the security deposit is a reduction of an amount of credit available to the customer (e.g., available via a credit card account associated with the customer). Some methods associated with an amount of credit available to a customer are described, for example, in U.S. patent application Ser. No. 08/932,984 entitled "System and Method for Issuing Security Deposit Guarantees Based on Credit Card Accounts" and filed Sep. 18, 1997. The security deposit may also comprise a right the customer has to receive a payment (e.g., a tax refund or a payment the customer is to receive in exchange for having performed work in the past). According to another embodiment, the security deposit comprises a lien on an item (e.g., the item being purchasing in the transaction).

According to one embodiment, the merchant device 220 arranges for the customer to provide the security deposit via a payment identifier associated with the customer. For example, the customer may provide the security deposit via a credit card account, a debit card account, a checking account, and/or an electronic payment protocol. According to another embodiment, someone other than the customer provides the security deposit (e.g., the security deposit may be provided by a friend or family member).

The merchant device 220 may also determine an amount associated with the security deposit. This amount may be based on, for example, information associated with the transaction or information associated with the customer. For example, a customer who has failed to perform a task in the past may be required to provide an increased security deposit amount. The amount may also be based on, for example, demographic information, psychographic information, an address, and/or a credit rating associated with the customer. According to one embodiment, the customer indicates an amount or type of security deposit he or she would like to provide (e.g., by selecting the type of security deposit from a list of appropriate types). According to one embodiment, the benefit to be applied to the transaction may be adjusted if the customer requests a particular security deposit amount.

The amount of the security deposit may also be based on the task or the benefit being applied to the transaction. For example, the security deposit may always be equal to the benefit applied to the transaction. The amount may also be based on the item being purchased by the customer (e.g., an item price and/or an item category) or the merchant involved in the transaction. According to another embodiment, the amount is based on information associated with the subsidy provider (e.g., a customer acquisition rate).

Based on the performance of the task by the customer, it is arranged for the security deposit to be returned or released to the customer. For example, the subsidy provider device 230 may determine that the customer has performed the task. In this case, the subsidy provider device 230 or the merchant device 220 may arrange for the security deposit payment to be returned to the customer (e.g., via a payment identifier). According to one embodiment, the performance of the task by the customer is evaluated, and the amount returned to the customer may be adjusted based on the evaluation.

FIG. 2B illustrates a transaction system 250 according to another embodiment of the present invention. In this case, a controller 500 facilitates transactions involving one or more customer devices 210, one or more merchant devices 220, and/or one or more subsidy provider devices 230. For example, the controller 500 may receive an indication that a customer is interested in purchasing an item from a merchant. Based on the received indication, the controller 500 transmits an offer to the customer device 210. The offer is to apply a benefit (provided by a subsidy provider via a benefit provider device 240) to the transaction in exchange for a future performance of a task by the customer.

A payment identifier is provided to the controller 500, and it is arranged for the customer to provide payment of a security deposit via the payment device 270. According to one embodiment, an escrow service device 260 may be used to hold the security deposit until the customer performs the appropriate task.

The performance of the task by the customer is verified, and the security deposit is returned to the customer based on the performance of the task. According to one embodiment, the payment device 270 (e.g., a credit card processing device) is used to return the security deposit to the customer.

According to another embodiment, the security deposit is "returned" to the customer by, for example, destroying a check signed by the customer or by destroying a Record Of Credit (ROC) associated with the customer's credit card account.

The operation of the transaction systems 200, 250 will now be described in more detail with respect to several transaction examples.

Transaction Examples

Alice visits a MACY'S® store and selects a shirt having a retail price of $100 to purchase. She brings the shirt to a POS terminal that is in communication with a merchant device 220. An employees of MACY'S® scans a Universal Product Category (UPC) code attached to the shirt, causing the POS terminal to display the following offer to Alice: "You can purchase this shirt for $60 if you promise to test drive a new FORD® automobile within the next thirty days!" Alice indicates to the employee that she accepts this offer, and gives the employee her credit card.

The merchant device 220 uses Alice's credit card number to arrange for her to provide payment of $60 in exchange for the shirt. In addition, the merchant device 220 arranges for Alice to provide payment of a $40 security deposit. The sales receipt given to Alice includes directions to a nearby FORD® dealership along with a transaction code (e.g., an alphanumeric code associated with the transaction).

Alice visits the FORD® dealership the next day and test drives a new automobile. She gives her sales receipt to an employee of the dealership. The employee uses a telephone (e.g., a subsidy provider device 230) to transmit the transaction code to the merchant device 220. The merchant device 220 verifies the transaction code and arranges for the $40 security deposit to be returned to Alice (e.g., via her credit card number). The FORD® dealership then arranges to provide payment of $50 to MACY'S® in exchange for acquiring the potential new customer.

According to another example, Bob accesses a Web site associated with an online merchant. He indicates that a particular model television having a retail price of $300 should be placed into his virtual shopping cart and receives the following message: "You can receive this television for only fifty percent of the retail price if you agree to subscribe to a cable television service for the next two years!"

Bob agrees and provides a payment of $150 to the online merchant. The online merchant also transfers a $150 security deposit from Bob's credit card account to the cable television company and transmits a transaction code to both Bob's PC and the cable television company.

Bob then accesses a Web site associated with the cable television company. The transaction code stored on Bob's PC is transmitted to the cable television company, which compares the code with the one received from the online merchant. After verifying that the codes match, the cable television company sells Bob a two year subscription to the cable television service and returns the $150 security deposit to Bob. Note that the security deposit does not need to equal the value of benefit that was applied to the transaction. For example, the online merchant could have instead transferred a $160 security deposit from Bob's credit card account.

According to another example, Carol visits a MOBIL® service station and begins to fill her automobile with gasoline. While doing so, the gasoline pump displays the following offer to Carol: "Agree to purchase the next two issues of SPORTS ILLUSTRATED® with your MOBIL® card and pay only $0.50 per gallon this visit!" Carol presses a button on the gasoline pump to indicate that she accepts this offer. When Carol swipes her credit card at the gasoline pump, she is only charged $0.50 per gallon for the gasoline. In addition, a credit limit associated with her credit card is reduced by $10 as a security deposit.

Carol, however, fails to purchase any issues of SPORTS ILLUSTRATED® with her MOBIL® card. In this case, MOBIL® may arrange for her to provide a penalty payment of $10 (e.g., in effect "not returning" her reduced credit limit).

Transaction timelines according to several embodiments of the present invention will now be described with respect to FIGS. 3A through 3E.

Transaction Timelines

Figure 3A:
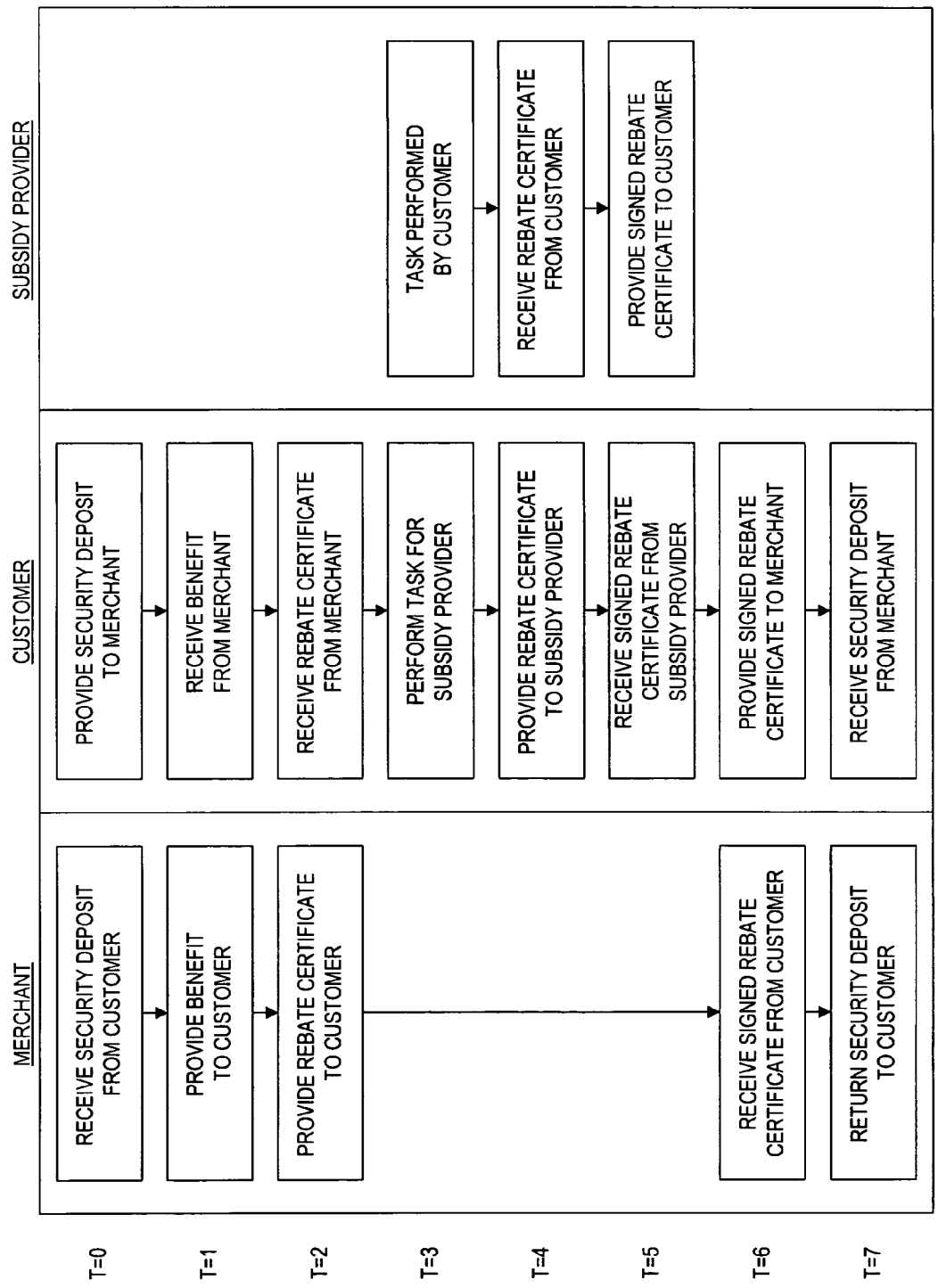
FIGS. 3A through 3E are transaction timelines according to some embodiments of the present invention.

FIG. 3A illustrates a transaction timeline according to one embodiment of the present invention. At the beginning of the transaction timeline, or "T=0," A customer provides a security deposit to the merchant. After receiving the security deposit, the merchant provides a benefit to the customer at T=1 (e.g., by applying a subsidy amount to a transaction). The merchant also provides a transaction code, such as a "rebate certificate," to the customer at T=2. The rebate certificate may be, for example, a printed voucher containing instructions to be followed by the customer.

The customer performs a task for a subsidy provider at T=3, and provides the rebate certificate to the subsidy provider at T=4. Because the customer has performed the task, the subsidy provider signs the rebate certificate and returns it to the customer at T=5. According to another embodiment of the present invention, the subsidy provider may instead provide the rebate certificate directly to the merchant at T=5.

The customer provides the signed rebate certificate to the merchant at T=6 to indicate that he or she has performed the task. The merchant then returns the security deposit to the customer at T=7.

Note that the present invention does not require the use of a printed and/or signed rebate certificate. For example, the merchant may instead transmit a transaction code to a customer device at T=2, and the subsidy provider may read the transaction code from the customer device at T=4. Similarly, the subsidy provider may transmit information to a customer device (or a merchant device) at T=5 or T=6 to indicate that the customer has performed the task and therefore the security deposit should be returned to the customer.

Note that, in addition to the events shown in FIG. 3A, the subsidy provider may provide a payment to the merchant in exchange for the customer's performance of the task. Such a payment may be made, for example, in advance (e.g., before any customer performs the task) or on a customer-by-customer basis as each customer performs the task. According to another embodiment, the subsidy provider returns the security deposit to the customer at T=5, making the events described with respect to T=6 and T=7 not necessary. In this case, the merchant may simply keep the security deposit it received from the customer to offset the benefit that was provided to the customer at T=1.

Figure 3B:
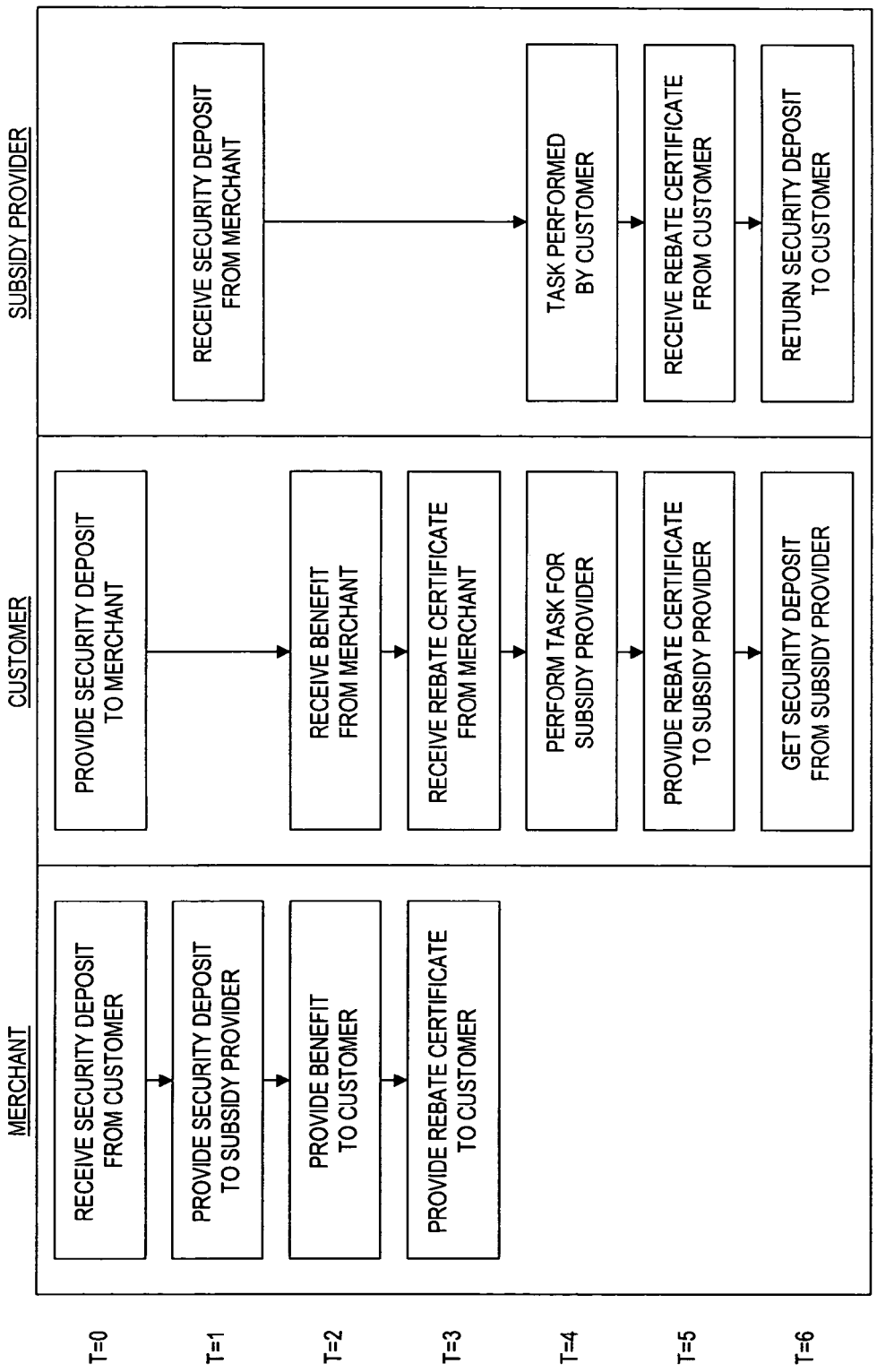

FIG. 3B illustrates a transaction timeline according to another embodiment of the present invention. At T=0, a customer provides a security deposit to the merchant. The merchant then transfers the security deposit to a subsidy provider at T=1, and provides a benefit to the customer along with a rebate certificate at T=2 and T=3.

The customer performs a task for a subsidy provider at T=4, and provides the rebate certificate to the subsidy provider at T=5. Because the customer has performed the task, the subsidy provider returns the security deposit at T=6. In this case, the subsidy provider may also provide a payment to the merchant. Such a payment may, for example, be based on the benefit provided by the merchant at T=2 (e.g., the payment may equal the value of the benefit plus a commission of $5).

Figure 3C:
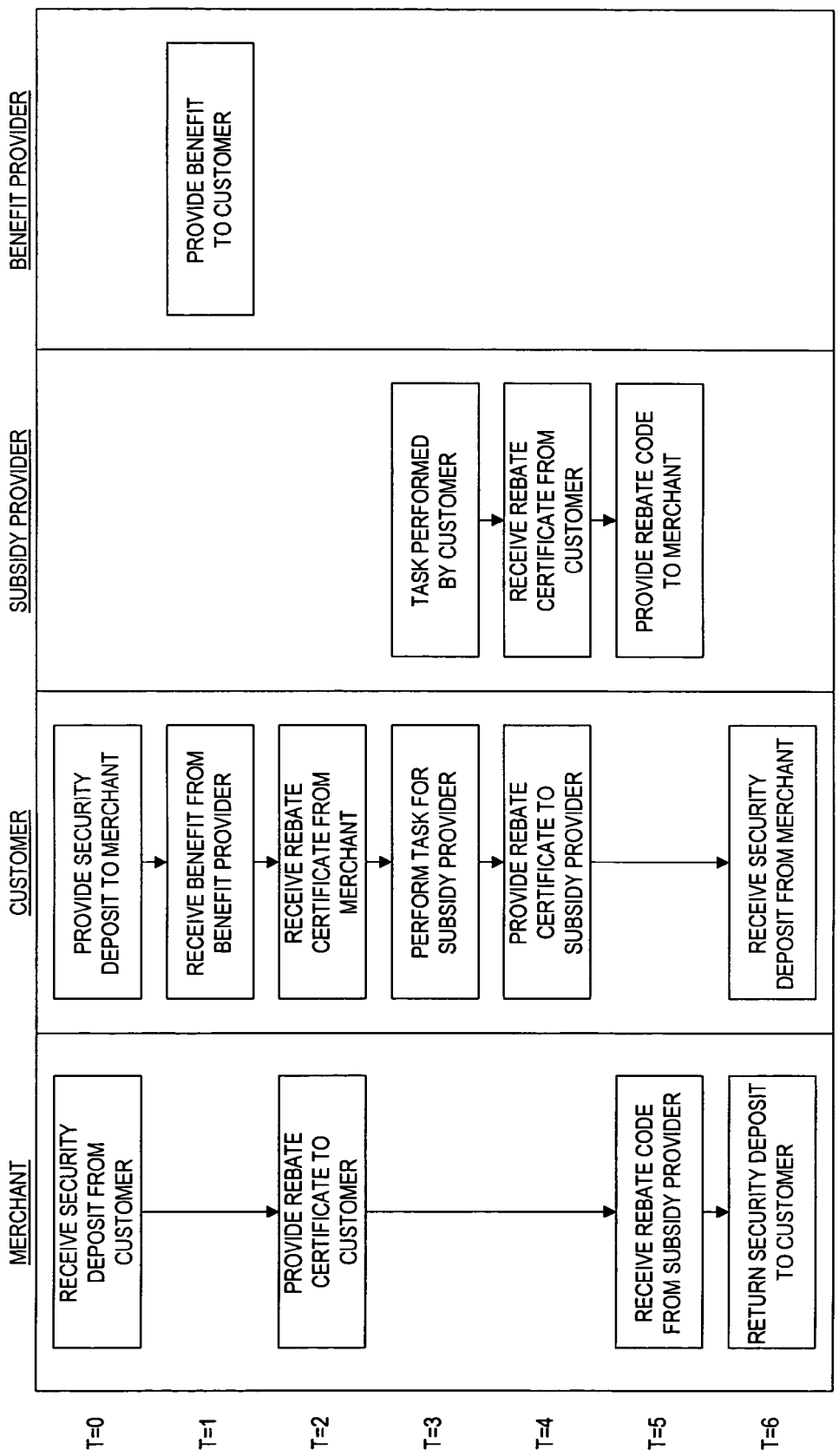

FIG. 3C illustrates a transaction timeline according to still another embodiment of the present invention.

At T=0, a customer provides a security deposit to the merchant. After receiving the security deposit, a benefit provider provides a benefit to the customer at T=1 (e.g., by awarding frequent flier miles to the customer). The merchant provides a rebate certificate to the customer at T=2.

The customer performs a task for a subsidy provider at T=3, and provides the rebate certificate to the subsidy provider at T=4. Because the customer has performed the task, the subsidy provider signs the rebate certificate and returns it to the customer at T=5. At T=6, the customer provides the signed rebate certificate to the merchant to indicate that he or she has performed the task. The merchant then returns the security deposit to the customer at T=7.

Figure 3D:
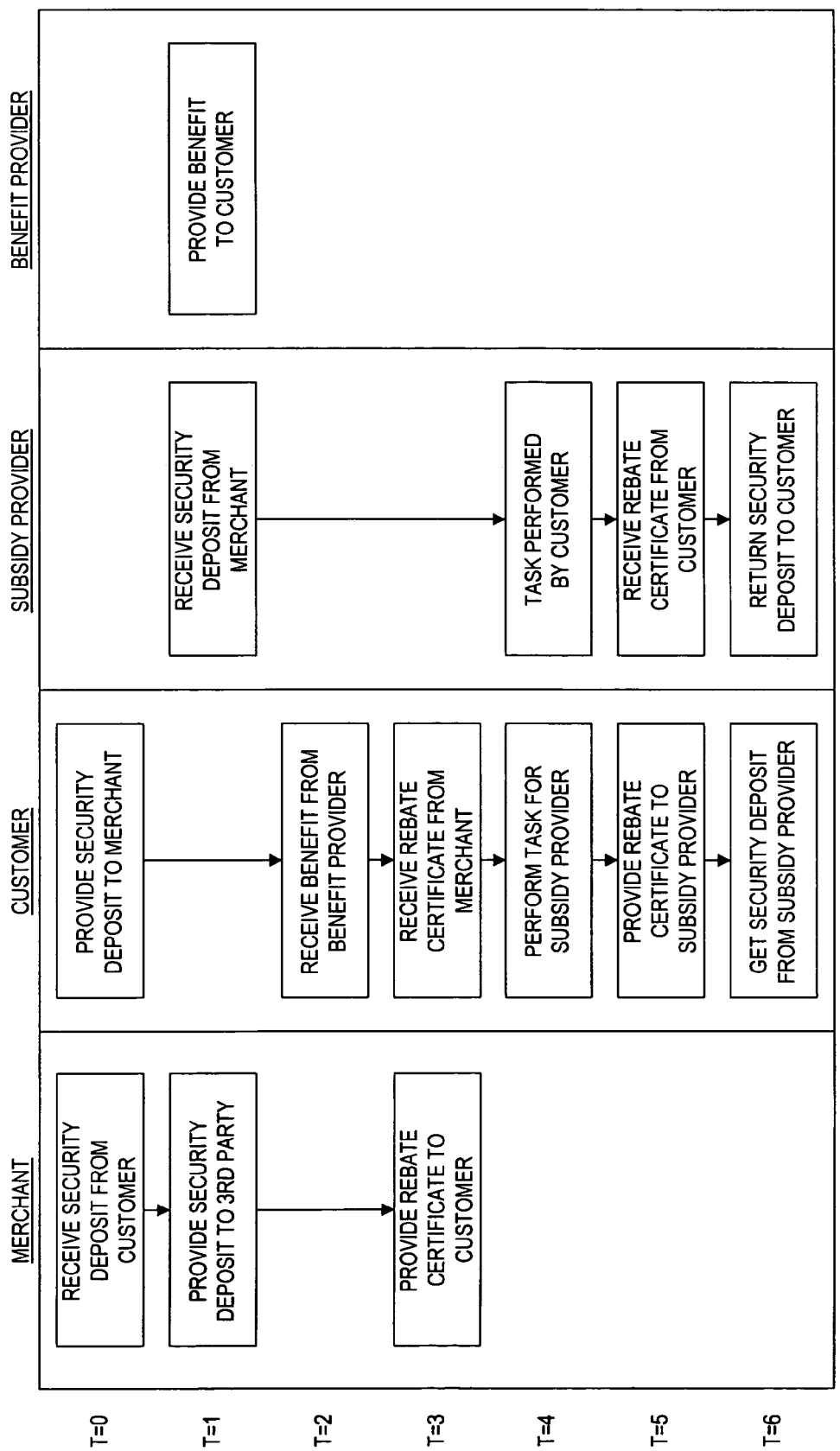

FIG. 3D illustrates a transaction timeline according to still another embodiment of the present invention. At T=0, a customer provides a security deposit to the merchant. The merchant then transfers the security deposit to a subsidy provider at T=1, and a benefit provider provides a benefit to the customer at T=2. In addition, the merchant provides a rebate certificate to the customer at T=3.

The customer performs a task for a subsidy provider at T=4, and provides the rebate certificate to the subsidy provider at T=5. Because the customer has performed the task, the subsidy provider returns the security deposit at T=6.

Figure 3E:
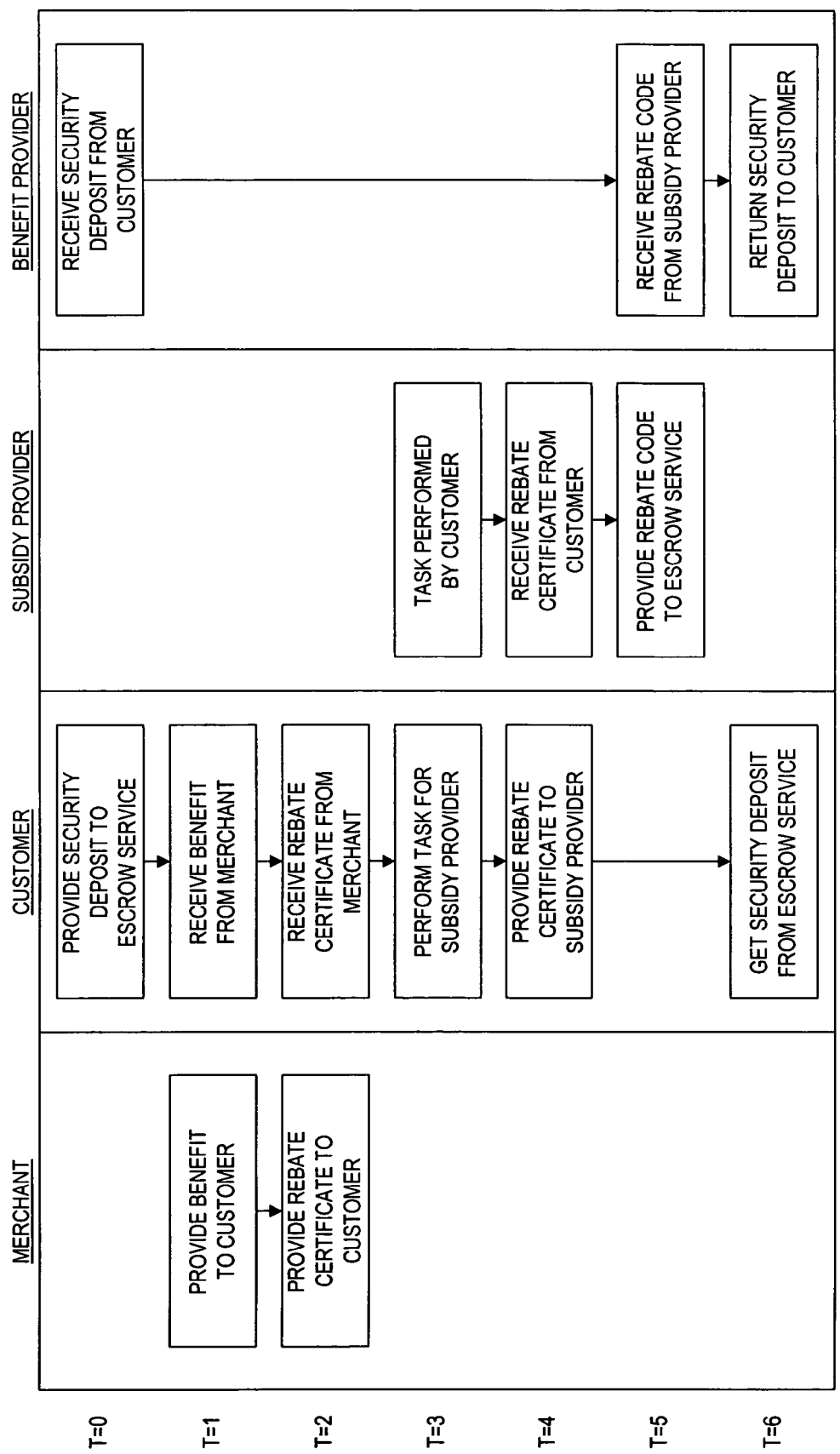

FIG. 3E illustrates a transaction timeline according to still another embodiment of the present invention. At T=0, a customer provides a security deposit to an escrow service (e.g., a credit card company or a bank), and the merchant provides a benefit to the customer along with a rebate certificate at T=1 and T=2.

The customer performs a task for a subsidy provider at T=3, and provides the rebate certificate to the subsidy provider at T=4. Because the customer has performed the task, the subsidy provider transmits a rebate code to the escrow service at T=5. Based on the received rebate code, the escrow service returns the security deposit to the customer at T=6.

Transaction flows according to several embodiments of the present invention will now be described with respect to FIGS. 4A through 4E.

Transaction Flows

Figure 4A:
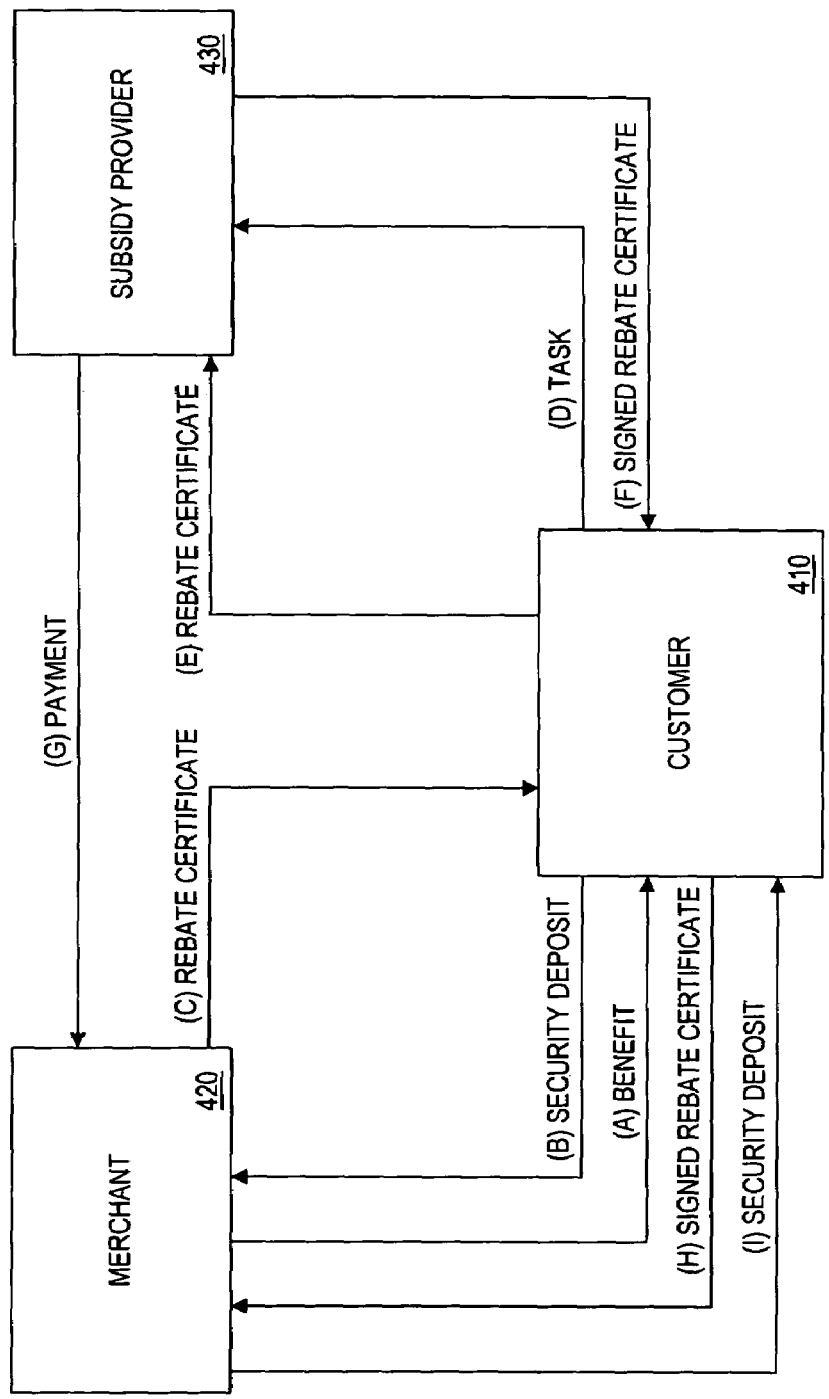
FIGS. 4A through 4E are transaction flow diagrams according to some embodiments of the present invention.

FIG. 4A illustrates a transaction flow according to one embodiment of the present invention. At (a), a customer 410 receives a benefit from a merchant 420. For example, the merchant 420 may apply a subsidy amount to a transaction associated with the customer 410. The customer 410 provides a security deposit to the merchant 420 at (b). For example, the customer 410 may provide payment of an amount associated with the benefit. As another example, the customer 410 may agree to leave with the merchant 420 one or more items he or she is purchasing.

At (c), the merchant 420 provides a rebate certificate to the customer 410. According to one embodiment, the rebate certificate is a transaction code transmitted to the customer's PDA. The transaction code may be, for example, a verifiable "hash" value generated when transaction information is used with a hash function, such as a one-way hash function. A hash function is a transformation that takes input information and returns a hash value. In general, one can think of a hash value as a "digital fingerprint" of the input information. For example, the input information to the hash function may be an item identifier, a customer's name and address, and information about a task (e.g., a task identifier). In this case, the hash function would generate the transaction code based on the input information. The merchant 420 (or a subsidy provider 430) could then validate the transaction code using another function. Applicable hash functions and other encryption techniques are described in Bruce Schneier, "Applied Cryptography: Protocols, Algorithms, and Source Code in C" (John Wiley & Sons, Inc., 2nd Ed. 1996).

According to another embodiment, the rebate certificate is a representation stored using the customer's PC, such as by storing the representation as a "cookie." A cookie may be a block of data that a Web server (e.g., associated with the merchant 420) stores on a client system (e.g., the customer's PC). When a customer 410 accesses the same Web site, or an associated Web site (e.g., a Web site associated with a subsidy provider 430), the browser of the customer's PC sends a copy of the cookie back to the Web server. Cookies may be used to identify customers associated with a PC, to instruct a Web server to send a customized version of a Web page, to track benefits, tasks, and security deposits associated with a customer and/or a transaction, and for other purposes.

According to another embodiment, the rebate certificate comprises a transaction code generated by the customer 410. For example, the customer 410 may supply a transaction password to the merchant 420, which then forwards the transaction password to the subsidy provider 430. When the customer 410 visits the subsidy provider 430 to perform a task, the subsidy provider 430 may ask the customer 410 for his or her transaction password. The subsidy provider 430 may then validate the transaction password received from the customer 410 by comparing it to a list of transaction passwords previously received from the merchant 420.

At (d), the customer 410 performs a task for the subsidy provider 430. At (e), the customer 410 provides the rebate certificate to the subsidy provider 430, who signs and returns the rebate certificate to the customer 410 at (f). The subsidy provider 430 also provides a payment to the merchant 420 at (g). For example, the subsidy provider 430 may provide payment of an amount associated with the benefit. In this way, the subsidy provider 430 may fund the benefit applied to the customer's transaction. According to one embodiment, the payment provided at (g) is provided before the merchant 420 applies the benefit applied to the customer's transaction.

The customer 410 gives the signed rebate certificate to the merchant 420 at (h). Based on the signed rebate certificate, the merchant 420 returns the security deposit to the customer 410 at (i).

Figure 4B:
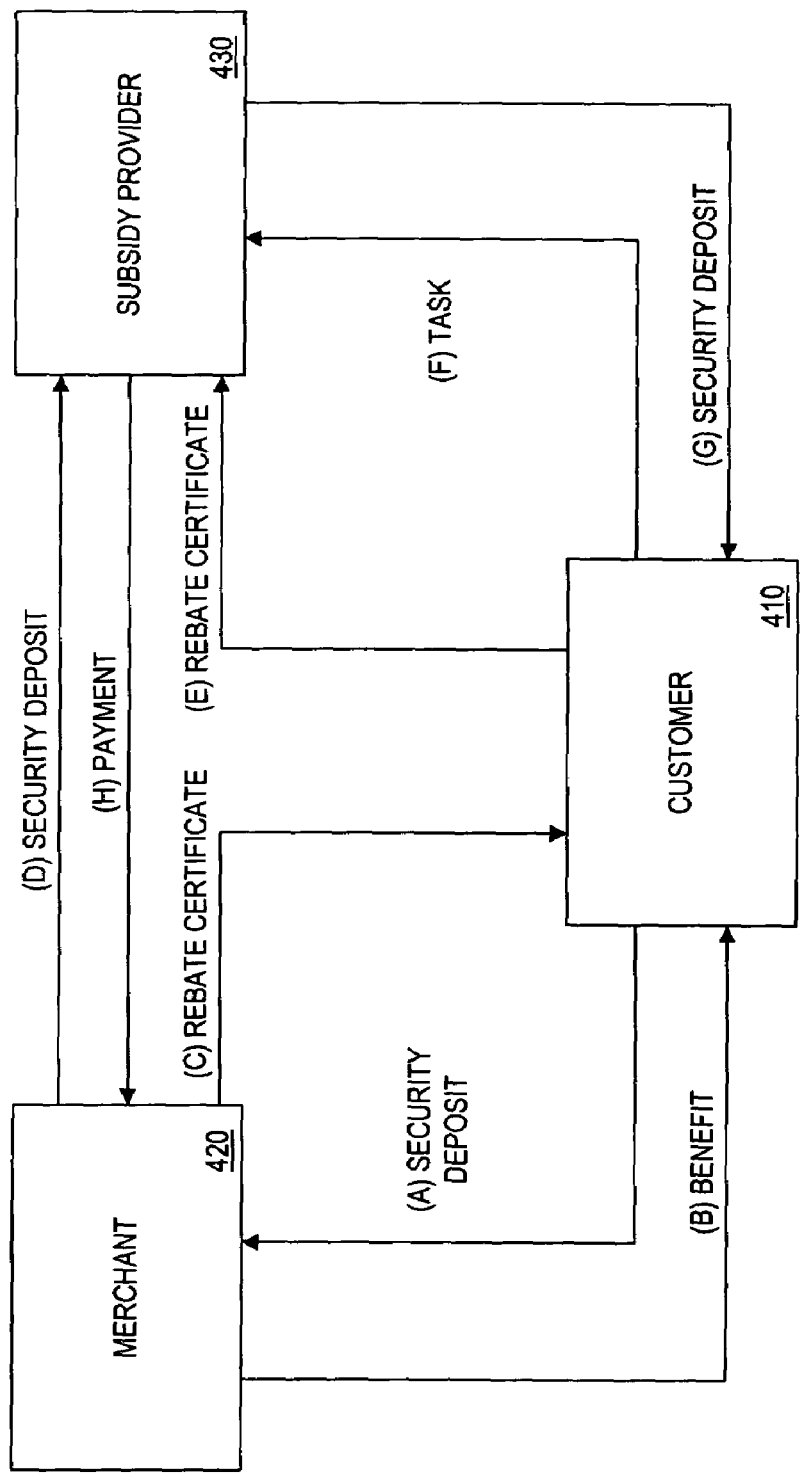

FIG. 4B illustrates a transaction flow according to another embodiment of the present invention. At (a), a customer 410 provides a security deposit to a merchant 420. At (b), the customer 410 receives a benefit from the merchant 420. For example, the merchant 420 may apply a subsidy amount to a transaction associated with the customer 410. The merchant 420 also provides a rebate certificate to the customer 410 at (c) and forwards the security deposit to a subsidy provider 430 at (d).

At (e), the customer 410 provides the rebate certificate to the subsidy provider 430 and performs a task for a subsidy provider 430 at (f). Based on the performance of the task, the subsidy provider then returns the security deposit to the customer at (g).

Figure 4C:
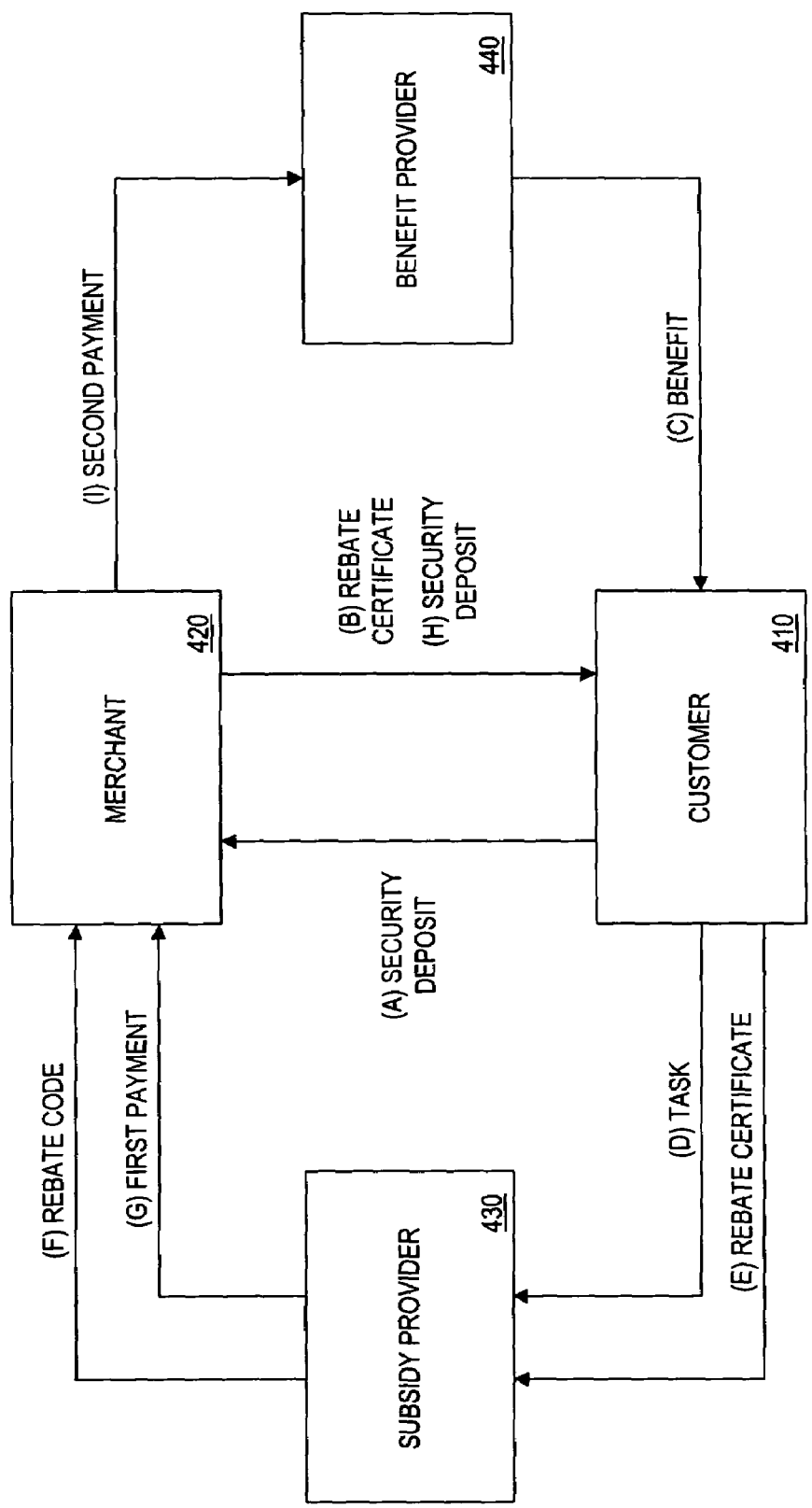

FIG. 4C illustrates a transaction flow according to still another embodiment of the present invention. At (a), a customer 410 provides a security deposit to a merchant 420. The customer 410 then receives a rebate certificate from the merchant 420 at (b).

At (c), the customer 410 receives a benefit from a benefit provider 440. For example, the benefit provider 440 may provide the customer 410 with frequent flier miles.

At (d), the customer 410 performs a task for a subsidy provider 430. At (e), the customer 410 provides the rebate certificate to the subsidy provider 430, who in turn transmits a rebate code to the merchant 420 at (f) to indicate the customer has performed the task as promised. In addition to the rebate code, the subsidy provider 430 may provide a first payment to the merchant 420 at (g).

Based on the received rebate code, the merchant 420 returns the security deposit to the customer 410 at (h). In addition, the merchant 420 may provide a second payment to the benefit provider 440 at (i). The second payment may or may not be based on the first payment made from the subsidy provider 430 to the merchant 420 at (g).

Figure 4D:
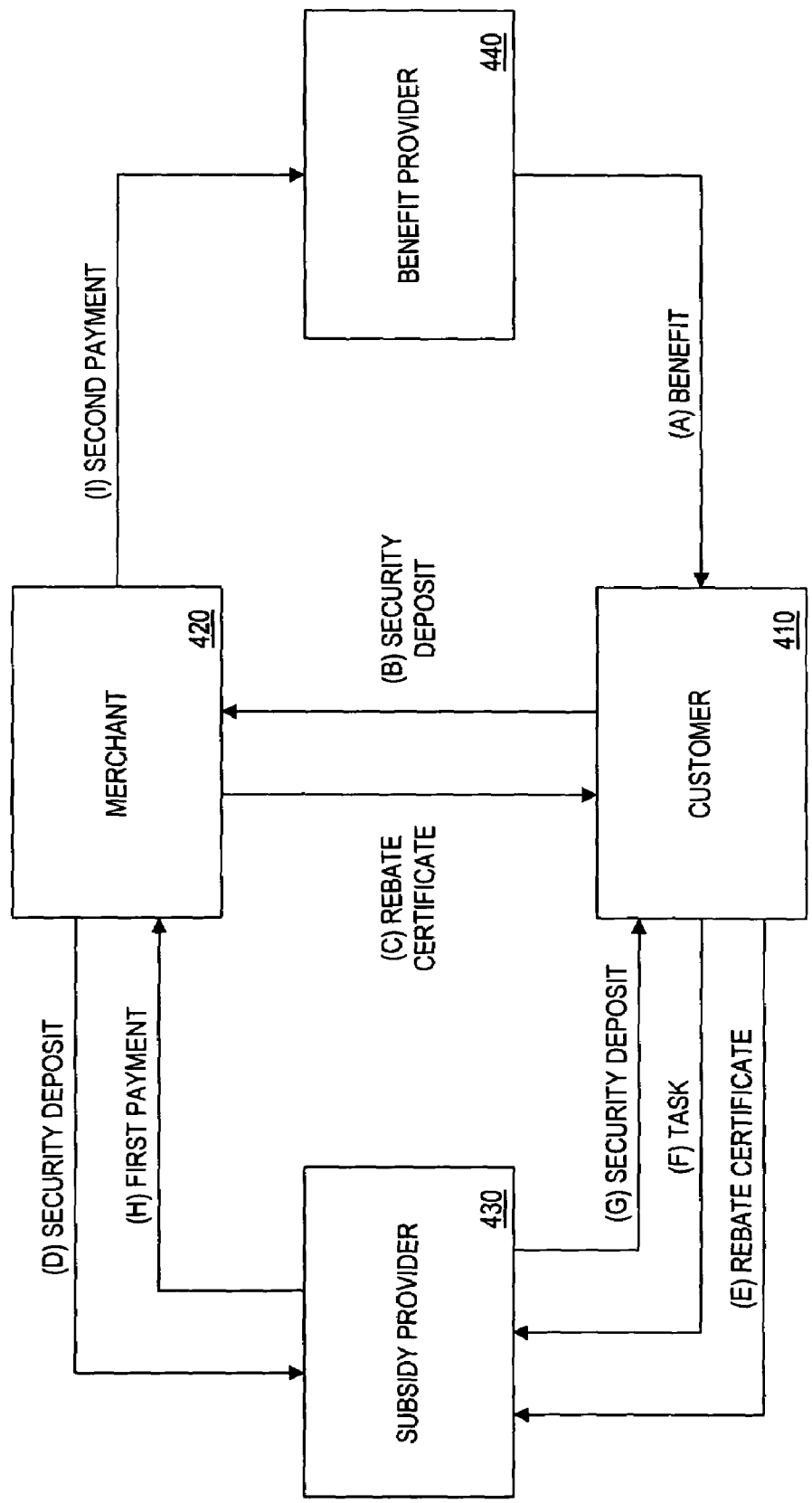

FIG. 4D illustrates a transaction flow according to still another embodiment of the present invention. At (a), a customer 410 receives a benefit from a benefit provider 440. For example, the benefit provider 440 may provide the customer 410 with frequent flier miles. At (b), the customer 410 provides a security deposit to a merchant 420. Note that in this case, the customer 410 receives the benefit before providing the security deposit. The customer 410 then receives a rebate certificate from the merchant 420 at (c). At (d), the merchant 420 forwards the security deposit to a subsidy provider 430.

The customer provides the rebate certificate to the subsidy provider 430 and performs the task at (e) and (f). After the customer has performed the task, the subsidy provider 430 returns the security deposit to the customer 410 at (g). In addition, the subsidy provider 430 provides a first payment to the merchant 420 at (h). The merchant 420 in turn may provide a second payment to the benefit provider 440 at (i). The second payment may or may not be based on the first payment made from the subsidy provider 430 to the merchant 420 at (h).

Figure 4E:
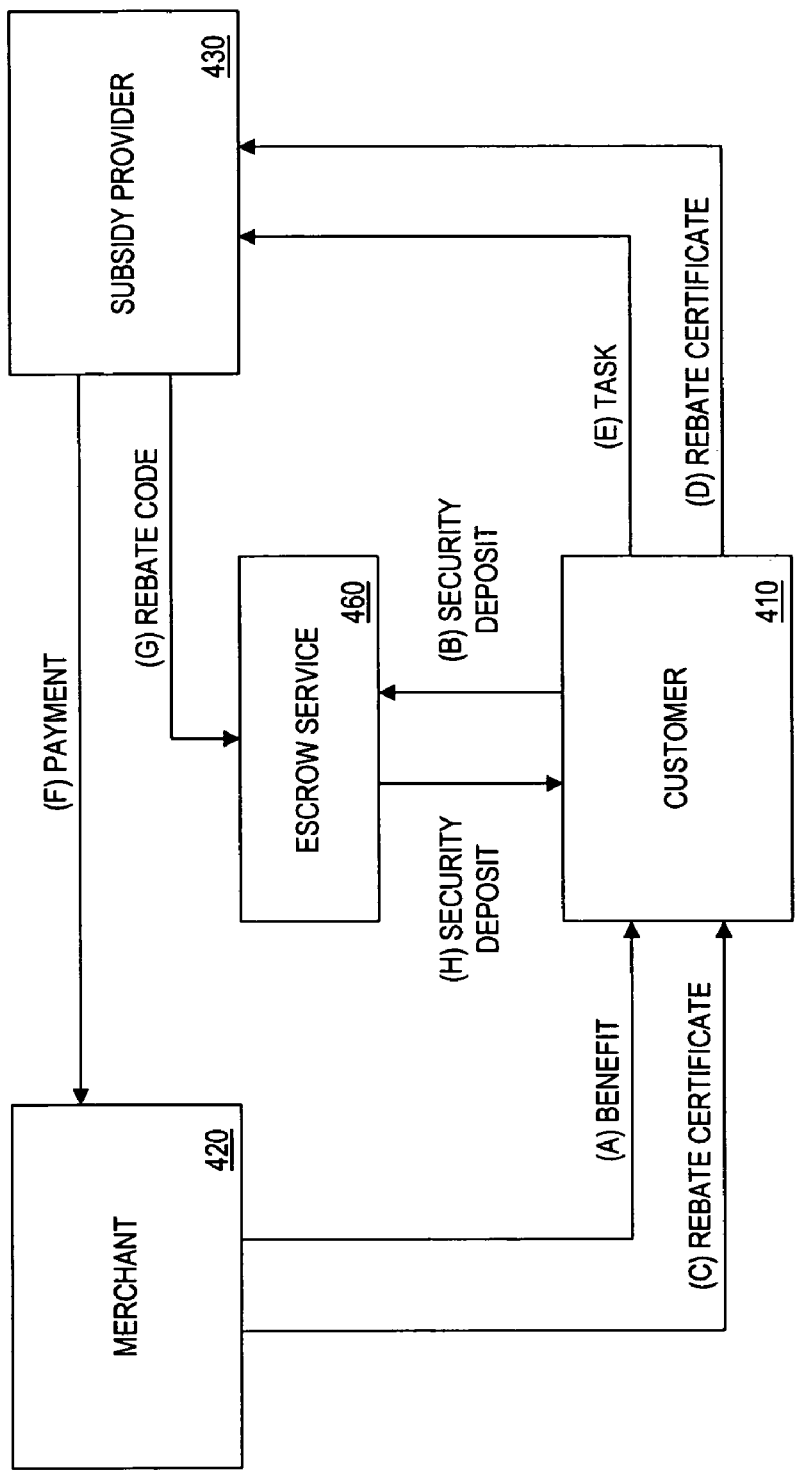

FIG. 4E illustrates a transaction flow according to still another embodiment of the present invention. At (a), a customer 410 receives a benefit from a merchant 420. For example, the merchant 420 may arrange for an item to be provided to a customer for free in exchange for the customer's promise to perform a task in the future. At (b), the customer 410 provides a security deposit to an escrow service 460. The escrow service 460 may be, for example, a bank, a credit card company, or any other trusted third party.

At (c), the customer 410 receives a rebate certificate from the merchant 420. The customer 410 then provides the rebate certificate to a subsidy provider 430 at (d) and performs the task at (e).

When the customer 410 has performed the task, the subsidy provider 430 provides a payment to the merchant 420 at (f) and transmits a rebate code to the escrow service at (g). The rebate code may be, for example, a verifiable hash value generated by the subsidy provider 430. According to another embodiment, the rebate code may simply be the rebate certificate.

The escrow service 460 may then verify the rebate code and return the security deposit to the customer 41 at (h). According to still another embodiment, the customer 410 may receive the rebate certificate from and/or provide the rebate certificate to the escrow service 460 instead of the merchant 420 and/or the subsidy provider 430.

Controller

Figure 5:
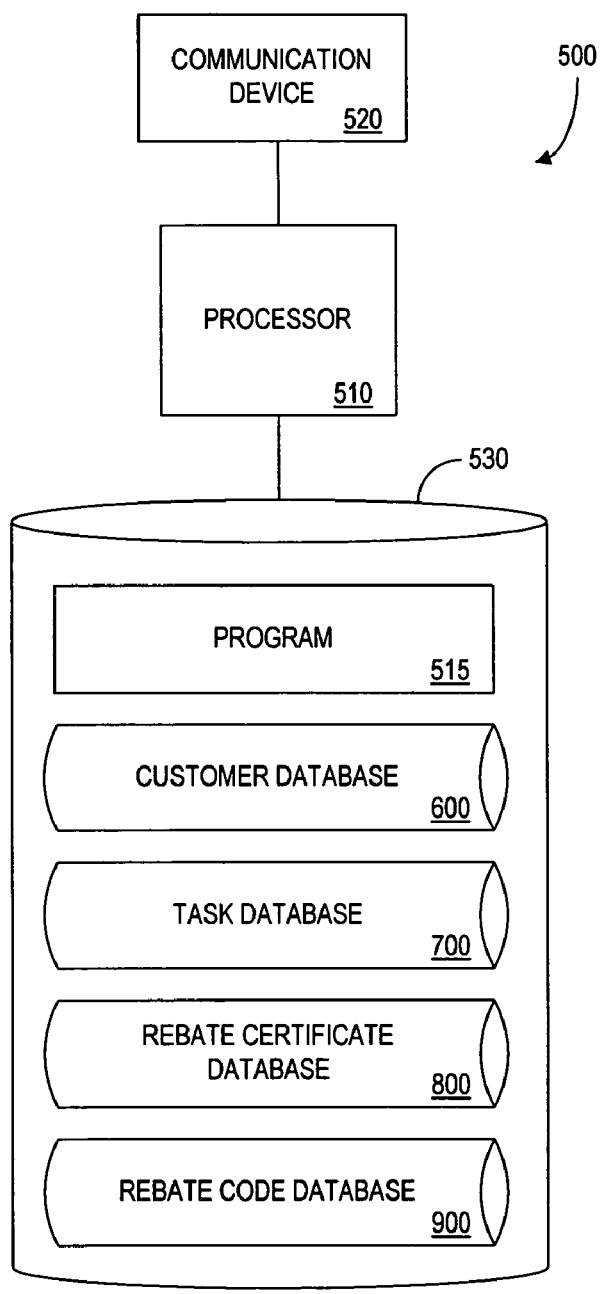
FIG. 5 is a block diagram of a controller according to an embodiment of the present invention.

FIG. 5 illustrates a controller 500 that is descriptive of the device shown in FIG. 2B according to one embodiment of the present invention. The controller 500 comprises a processor 510, such as one or more INTEL® Pentium® processors, coupled to a communication device 520 configured to communicate through a communication network (not shown in FIG. 5). Note that the controller 500 may comprise a single computer, a network, or any other device capable of performing the functions described herein. The communication device 520 may be used to communicate, for example, with one or more customer devices 310, merchant devices 220, subsidy provider devices 230, benefit provider devices 240, escrow service devices 260, and/or payment devices 270.

The processor 510 is also in communication with a storage device 530. The storage device 530 may comprise any appropriate storage device, including combinations of magnetic storage devices (e.g., magnetic tape and hard disk drives), optical storage devices and semiconductor memory devices, such as Random Access Memory (RAM) devices and Read Only Memory (ROM) devices.

The storage device 530 stores a program 515 for controlling the processor 510. The processor 510 performs instructions of the program 515, and thereby operates in accordance with the present invention. For example, the processor 510 may arrange for a benefit to be applied to a transaction in exchange for a future performance of a task by a customer, arrange for the customer to provide a security deposit, and arrange for the security deposit to be returned to the customer based on the performance of the task.

The program 515 may be stored in a compressed, uncompiled and/or encrypted format. The program 515 furthermore includes program elements that may be necessary, such as an operating system, a database management system, and "device drivers" used by the processor 510 to interface with peripheral devices. Appropriate program elements are known to those skilled in the art.

Note that the processor 510 and the storage device 530 may be, for example, located entirely within a single computer or other computing device or located in separate devices coupled through a communication channel. In one embodiment, the controller 500 comprises one or more computers that are connected to a remote database server.

As used herein, information may be "received" by or "transmitted" to, for example, (i) the controller 500 from any other device, or (ii) a software application or module within the controller 500 from another software application, module, or any other source (e.g., including another source within the controller 500).

As shown in FIG. 5, the storage device 530 also stores a customer database 600 (described with respect to FIG. 6), a task database 700 (described with respect to FIG. 7), a rebate certificate database 800 (described with respect to FIG. 8), and a rebate code database 900 (described with respect to FIG. 9). Examples of databases that may be used in connection with the transaction system 500 will now be described in detail with respect to FIGS. 6 through 9. Each figure depicts a database in which the data is organized according to a data structure in accordance with embodiments of the present invention. The data may be stored, for example, on a computer readable medium and be accessible by a program executed on a data processing system. The schematic illustrations and accompanying descriptions of the databases presented herein are exemplary, and any number of other database arrangements could be employed besides those suggested by the figures.

Customer Database

Referring to FIG. 6, a table represents one embodiment of the customer database 600 that may be stored at the controller 500 shown in FIGS. 2B and 5 according to an embodiment of the present invention. The table includes entries identifying customers that may purchase products via the controller 500. The table also defines fields 602, 604, 606, 608 for each of the entries. The fields specify a customer identifier 602, a name 604, contact information 606, and a payment identifier 608.

The customer identifier 602 may be, for example, an alphanumeric code associated with a customer who may purchase a product via the controller 500. The customer identifier 602 may be, for example, generated by the controller 500 when a customer registers to use the controller 500 or may be created by the customer (e.g., when the customer creates a user name and password).

The name 604 and contact information 606 may represent the customer's name and contact information (e.g., a mailing address, an electronic mail address, and/or a telephone number), respectively, and may be based on information received from the customer device 210 when the customer registers to use the controller 500 or when the customer submits offer information (e.g., an offer to purchase an item or an offer to perform a task). The contact information 606 may be used, for example, to communicate with a customer device 210 when offer information is evaluated by the controller 500 (e.g., to arrange for the customer to purchase a product or to remind a customer that a task should be performed). For example, the controller 500 may send a customer the following electronic mail message: "Don't forget, you promised to visit BURGER KING® by the end of this month!"

The payment identifier 608 may be, for example, a credit card number, a debit card number, a checking account number, or digital payment protocol information that can be used to receive payment from the customer (e.g., to receive payment of an reduced price in exchange for a product). The payment identifier 608 may also, according to some embodiments of the present invention, be used to receive a security deposit from the customer. The payment identifier 608 may be based on, for example, information received from the customer device 210 when the customer registers to use the controller 500 or when the customer purchases an item.

Task Database

Referring to FIG. 7, a table represents one embodiment of the task database 700 that may be stored at the controller 500 shown in FIGS. 2B and 5 according to an embodiment of the present invention. The table includes entries identifying tasks that a customer may promise to perform in exchange for a benefit. The table also defines fields 702, 704, 706, 708, 710 for each of the entries. The fields specify a task identifier 702, a description of task 704, a subsidy provider 706, a benefit for performing task 708, and a security deposit 710.

The task identifier 702 may be, for example, an alphanumeric code associated with a task that may be performed by a customer. The task identifier 702 may be, for example, generated by the controller 500 when a subsidy provider arranges to have benefits provided to customers via the controller 500.

The description of task 704 may indicate, for example, one or more tasks that a customer must promise to perform in order to receive a benefit. The description of task 704 may include, for example, text, audio, and/or image information. According to one embodiment of the present invention, the description of task 704 is transmitted to a customer when an offer is provided (e.g., via a POS terminal or via a Web site).

The subsidy provider 706 may indicate, for example, the party that funds the benefit being provided to the customer. For example, the subsidy provider 706 may provide one or more payments to a merchant, who in turns applies benefits to customer transactions. According to one embodiment of the present invention, the subsidy provider 706 indicates the party on whose behalf the customer will perform the task.

The benefit for performing task 708 indicates the benefit the customer will receive in exchange for promising to perform the task in the future. The benefit for performing task 708 may include, for example, text, audio, and/or image information. According to one embodiment of the present invention, the benefit for performing task 708 is transmitted to a customer a when an offer is provided (e.g., via a POS terminal or via a Web site).

The security deposit 710 indicates what the customer must provide to secure the benefit he or she receives in exchange for a promise to perform the task in the future. The security deposit 710 may comprise, for example, a fixed monetary value, a variable monetary value, and/or an alternate currency (e.g., "tokens" or coupons that may be used in other transactions by the customer).

Rebate Certificate Database

Referring to FIG. 8, a table represents one embodiment of the rebate certificate database 800 that may be stored at the controller 500 shown in FIGS. 2B and 5 according to an embodiment of the present invention. The table includes entries identifying rebate certificates that have been issued by the controller 500. The table also defines fields 802, 804, 806, 808, 810 for each of the entries. The fields specify a rebate certificate identifier 802, a customer identifier 804, a task identifier 806, a task deadline 808, and a task status 810.

The rebate certificate identifier 802 may be, for example, an alphanumeric code associated with a rebate certificate that has been issued by the controller 500 (e.g., when a customer has received a benefit and provided a security deposit). The customer identifier 804 indicates a customer who has purchased a product via the controller 500, and may or may not be associated with the customer identifier 602 stored in the customer database 600.

The task identifier 806 indicates the task to be performed by the customer with respect to a transaction, and may or may not be associated with the task identifier 702 stored in the task database 700. The task deadline 808 may indicate, for example, a time and/or date by which a customer must perform a task in order to have his or her security deposit returned. The task status 810 may indicate, for example, if a customer has not yet performed a task (e.g., "pending"), if a customer has performed a task (e.g., "complete"), or if a customer has failed to perform a task by the task deadline 808 (e.g., "overdue"). The task status 810 may be used, for example, by the controller 500 to determine when a security deposit should be returned to a customer (e.g., when the task status 810 indicates "complete").

Rebate Code Database

Referring to FIG. 9, a table represents one embodiment of the rebate code database 900 that may be stored at the controller 500 shown in FIGS. 2B and 5 according to an embodiment of the present invention. The table includes entries identifying rebate codes that the controller 500 has received (or may receive in the future) from a subsidy provider. The table also defines fields 902, 904 for each of the entries. The fields specify a rebate code 902 and a subsidy provider 904.

The rebate code 902 may be, for example, an alphanumeric code associated with a security deposit received from a customer. The rebate code 902 may be, for example, generated by the controller 500 when a customer provides the security deposit. According to one embodiment, a rebate code 902 is uniquely generated for each security deposit.

The subsidy provider 904 may indicate the party who has (or will) provide the rebate code 902 to the controller 500. For example, as illustrated by the fourth entry in FIG. 9, the controller expects to receive a rebate code 902 of "CODE-4-031415" from EBAY.COM®. When the controller 500 receives "CODE-4-031415" from EBAY.COM®, the rebate code 902 and the subsidy provider 904 can be verified, and the appropriate security deposit can be returned to the appropriate customer.

Methods that may be used in connection with the transaction systems 200, 250 according to some embodiments of the present invention will now be described in detail with respect to FIGS. 10 through 12.

Transaction System Methods

Figure 10:
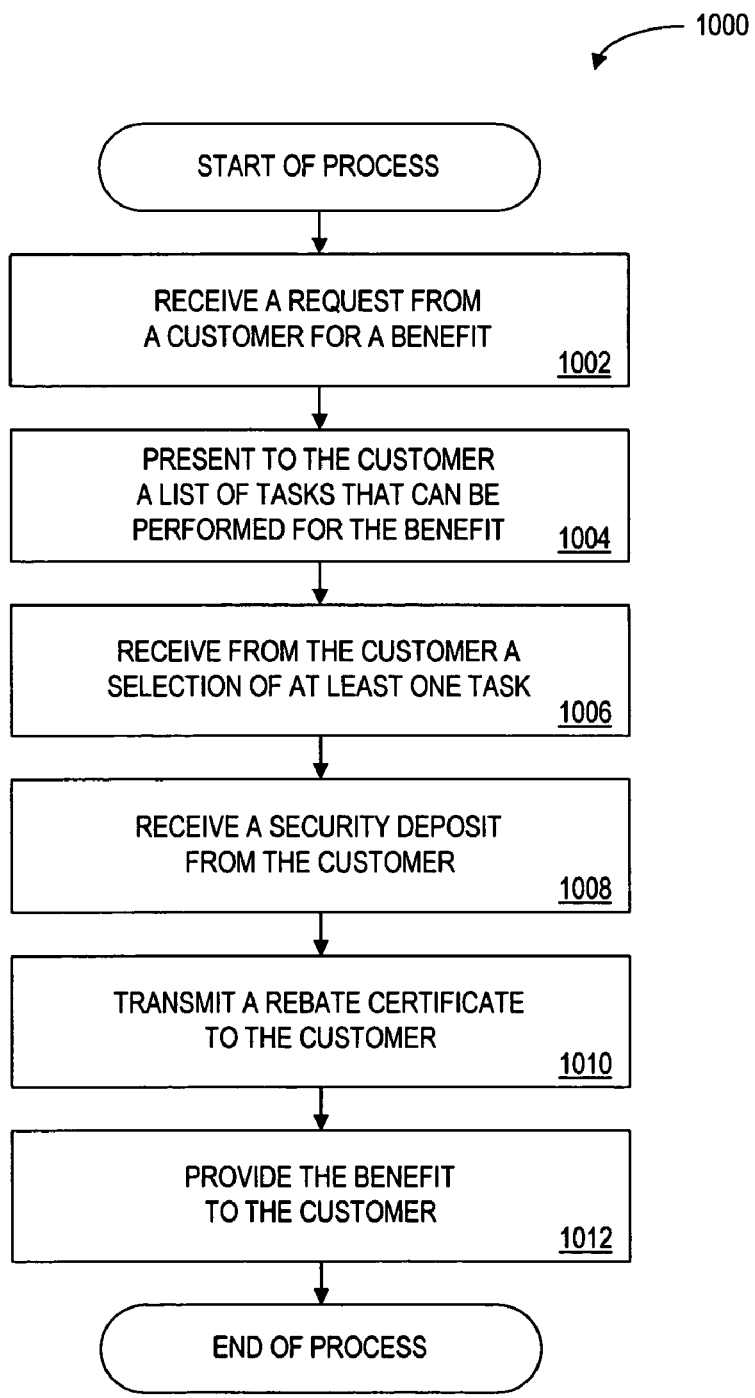
FIG. 10 is a flow chart of a transaction method according to an embodiment of the present invention.

FIG. 10 is a flow chart of a transaction method 1000 according to an embodiment of the present invention. The methods shown in FIGS. 10 through 12 may be performed, for example, by the controller 500, the merchant device 220, and/or any other device or devices (including the other devices disclosed herein). Note that the flow charts discussed herein do not imply a fixed order to the steps, and embodiments of the present invention may be practiced in other orders.

At 1002, a request for a benefit is received from a customer. The request may comprise, for example, a customer asking a store employee if an item price can be reduced by a requested amount (e.g., $5 or 25%). At 1004, a list of tasks that can be performed for the requested benefit is presented to the customer. For example, a monitor at a kiosk may display the following tasks to the customer: "1) test drive an automobile, 2) fill out ten surveys over the next ten weeks, or 3) refer five friends to the following merchant." According to another embodiment, a merchant's employee may instead describe the tasks to the customer.

At 1006, a selection of at least one task is received from the customer. For example, a customer may use an input device at a kiosk (e.g., a touch screen) to select one of the tasks. Note that a customer who selects more than one task may have an increased benefit applied to his or her transaction.

A security deposit is received form the customer at 1008. For example, a customer's credit card may be used to receive payment of an amount equal to the benefit requested by the customer.

At 1010, a rebate certificate is transmitted to the customer. For example, information may be transmitted to a customer's PC enabling the PC to create a printed voucher. According to another embodiment, the rebate certificate comprises information stored, for example, on a customer's PC or PDA. According to still another embodiment, the rebate certificate is a code provided to the customer in a human-recognizable format (e.g., "indicate to the automobile dealership that the test drive is associated with the MACY25-RED promotion").

At 1012, the benefit is provided to the customer. For example, a price associated with an item being purchased by a customer may be reduced (e.g., reduced by 50%, reduced to zero, or reduced to a "cost" of the item to the merchant).

Figure 11:
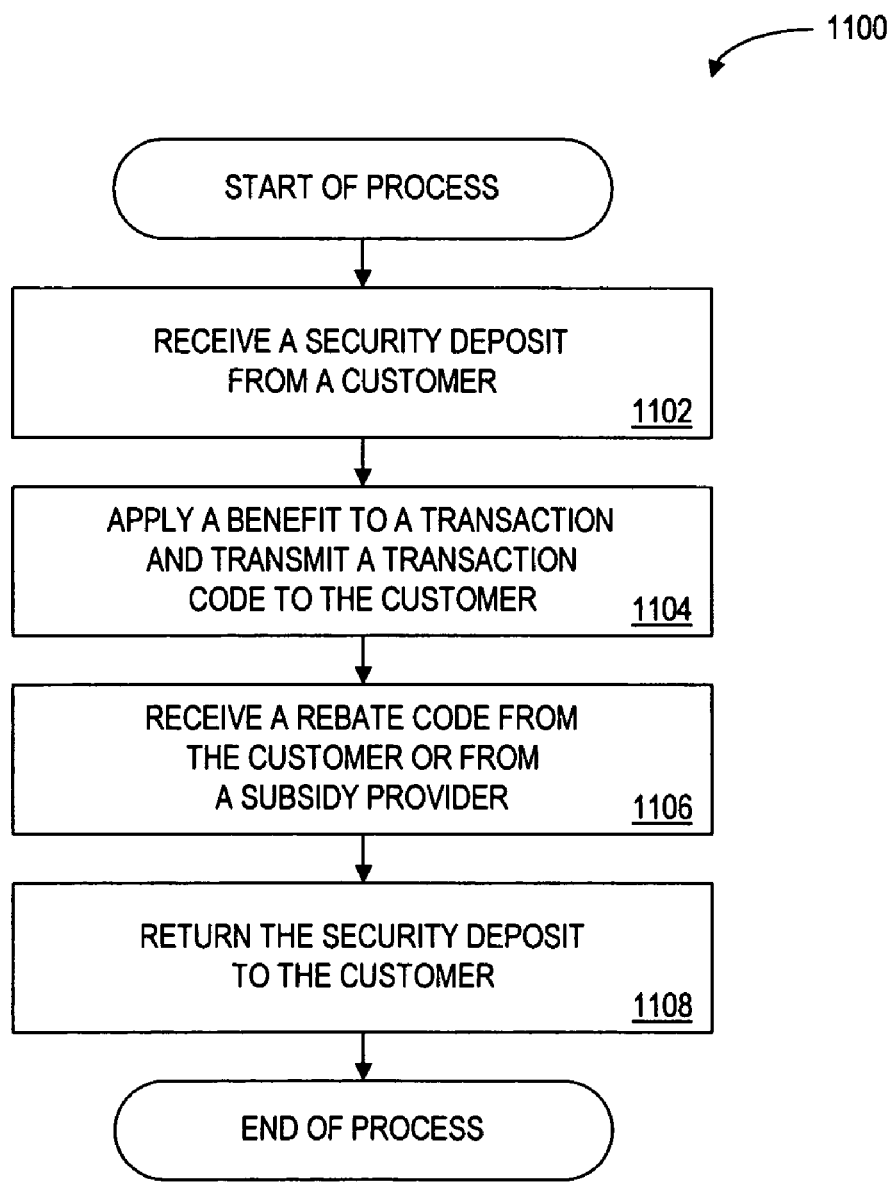
FIG. 11 is a flow chart of a transaction method according to another embodiment of the present invention.

FIG. 11 is a flow chart of a transaction method 1100 according to an embodiment of the present invention. At 1102, a security deposit is received from the customer. At 1104, a benefit is applied to a transaction and a rebate code is transmitted to the customer (e.g., by printing the transaction code on a rebate certificate).

At 1106, a rebate code is received from the customer or from a subsidy provider. The rebate code may be, for example, a verifiable code generated by the subsidy provider after the customer has performed the task. If the rebate code is received from the subsidy provider, the rebate code may simply be the same as the transaction code transmitted at 1104. Based on the received rebate code, the security deposit is returned to the customer at 1106.

Figure 12:
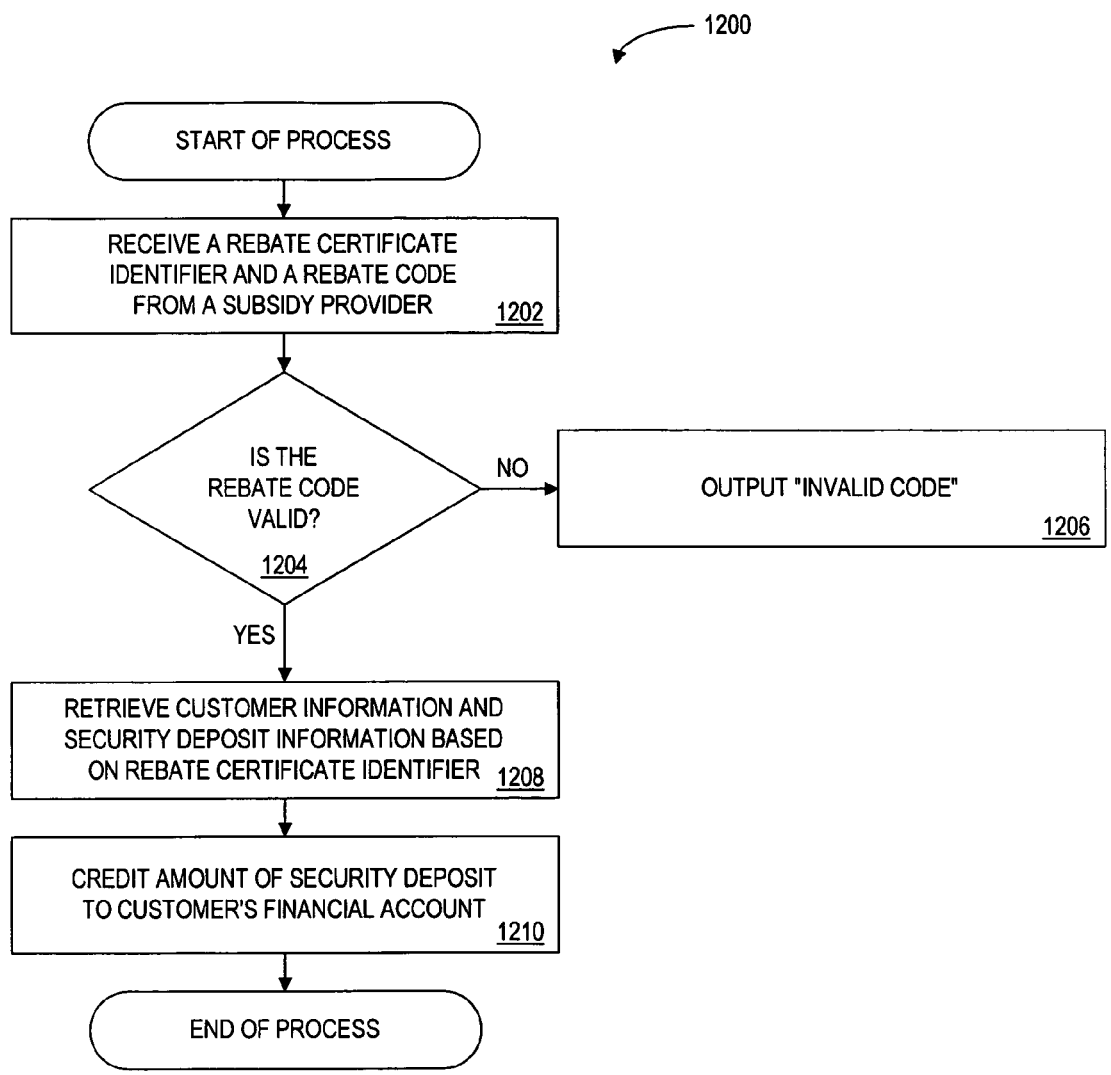
FIG. 12 is a flow chart of a transaction method according to another embodiment of the present invention.

FIG. 12 is a flow chart of a transaction method 1200 according to an embodiment of the present invention. At 1202, a rebate certificate identifier and a rebate code are received from a subsidy provider. If the rebate code is not valid at 1204, an "invalid code" message is output at 1206 (and no security deposit is returned to a customer). The rebate code may be validated, for example, by using a hash function or by comparing the rebate code to a list of valid rebate codes (e.g., using the rebate code database 900).

If the rebate code is valid at 1204, customer information and security deposit information are retrieved at 1208 based on the rebate certificate identifier (e.g., by retrieving the information using the customer database 600, the task database 700, and/or the rebate certificate database 800). At 1210, the appropriate amount is then credited to the customer's financial account (e.g., credit card account) to return the security deposit to the customer.

Thus, embodiments of the present invention let a customer immediately receive a benefit in exchange for promising to perform a task in the future. Moreover, the merchant, or other benefit provider, secures the benefit by receiving a security deposit from the customer.

ADDITIONAL EMBODIMENTS

The following are several additional embodiments which illustrate various aspects of the present invention. These embodiments do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

According to one embodiment, a customer may promise that one or more other parties will perform a task. For example, a customer may promise that at least two of his or her friends will access a particular Web site within the next thirty days. In this case, the security deposit may be returned to the customer after the other parties have performed the task. According to another embodiment, a customer may be a member of a customer team or group. In this case, a customer may promise that one or more members (e.g., that all of the members) in his or her group will perform a task in the future. Similarly, a customer may arrange for one or more members to provide a security deposit.

According to another embodiment, a task may be "transferable." For example, a first customer may agree to test drive a new automobile in exchange for a benefit. If the first customer decides that he or she does not want to test drive the automobile, the first customer can arrange for the one of his or her friends to do so. After the friend test drives the automobile, the security deposit is returned to the first customer.

According to still another embodiment, the task is not fully defined when the benefit is applied to the transaction. For example, a customer may agree to "give up two hours" of his or her time. The customer can then subsequently be instructed how that time should be used.

According to yet another embodiment, a customer promises to perform a series of related tasks (e.g., to purchase one box of CORN FLAKES® each week for the next month) or un-related tasks. In this case, the security deposit may be returned to the customer in installments as he or she performs each of the tasks.

According to yet another embodiment, a customer may have performed a task prior to having the benefit applied to the transaction. In this case, a subsidy provider may simply sign a rebate certificate after verifying that the customer had in fact previously performed the task.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating a transaction between a customer and a merchant, comprising:
    arranging, by a merchant, for a benefit to be applied to the transaction in exchange for a future performance of a task by the customer, the benefit comprising a subsidy and the task being associated with a subsidy provider other than the merchant, and wherein the benefit is applied to the transaction before performance of the task by the customer;
    arranging for the customer to provide a security deposit; and
    returning the security deposit to the customer based on the performance task.

2. The method of claim 1, wherein the transaction comprises a purchase by the customer of at least one of: (i) an item; (ii) a product; and (iii) a service.

3. The method of claim 1, wherein the benefit comprises at least one of: (i) a reduction in an amount of payment provided by the customer; (ii) a supplemental item received by the customer, (iii) a substitute item received by the customer, (iv) an amount of payment received by the customer, (v) a payment of an alternate currency to the customer, (vi) an improved transaction term, (vii) an improved warranty term, and (viii) an improved interest rate term.

4. The method of claim 1, wherein said arranging for the benefit to be applied to the transaction comprises:
    transmitting to the customer an offer to apply the benefit to the transaction in exchange for the future performance of the task by the customer; and
    receiving from the customer a response to the offer.

5. The method of claim 4, wherein said transmitting is performed in response to receiving an indication that the customer is interested in purchasing an item.

6. The method of claim 1, wherein the security deposit comprises a payment by the customer.

7. The method of claim 1, wherein the security deposit comprises a reduction of an amount of credit available to the customer.

8. The method of claim 1, wherein said arranging for the customer to provide the security deposit further comprises:
    receiving a payment identifier from the customer; and
    arranging for the customer to provide payment of the security deposit using the payment identifier.

9. The method of claim 8, wherein the payment identifier comprises at least one of: (i) a credit card number, (ii) a debit card number, (iii) a bank account number, and (iv) electronic payment protocol information.

10. The method of claim 1, further comprising:
determining the benefit.

11. The method of claim 10, wherein said determining is based on information associated with the transaction.

12. The method of claim 10, wherein said determining is based on information associated with the customer.

13. The method of claim 12, wherein the information associated with the customer comprises at least one of: (i) demographic information, (ii) psychographic information, (iii) an address, (iv) a credit rating, and (v) a transaction history.

14. The method of claim 10, wherein said determining is based on information associated with the task.

15. The method of claim 10, wherein said determining is based on information associated with an indication received from a customer device.

16. The method of claim 11, wherein said determining is based on information associated with an item purchased by the customer in the transaction.

17. The method of claim 16, wherein the information associated with the item comprises at least one of: (i) an item price, and (ii) an item category.

18. The method of claim 10, wherein said determining is based on information associated with the merchant.

19. The method of claim 10, wherein said determining is based on at least one of: (i) information associated with the subsidy provider, and (ii) a customer acquisition rate.

20. The method of claim 1, wherein returning the security deposit to the customer comprises:
providing a payment to the customer.

21. The method of claim 1, wherein returning the security deposit to the customer comprises
arranging for the subsidy provider to provide a payment to the customer.

22. The method of claim 1, wherein returning the security deposit to the customer comprises:
transmitting information associated with the transaction to at least one of: (i) the customer, and (ii) the subsidy provider.

23. The method of claim 1, wherein returning the security deposit to the customer comprises:
receiving information associated with the performance of the task from at least one of: (i) the customer, and (ii) the subsidy provider.

24. The method of claim 23, further comprising:
verifying the received information associated with the performance of the task.

25. The method of claim 23, wherein the information associated with the performance of the task comprises a hash value.

26. The method of claim 23, wherein said receiving comprises:
receiving the information associated with the performance of the task from a customer device.

27. The method of claim 23, wherein said receiving comprises:
receiving the information associated with the performance of the task from the customer in a human-recognizable format.

28. An apparatus for facilitating a transaction between a customer and a merchant, comprising:
a processor; and
a storage device coupled to said processor and storing instructions adapted to be executed by said processor to:
arrange for a benefit to be applied to the transaction in exchange for a future performance of a task by the customer, wherein the benefit does not comprise a product and the task being associated with a party other than the merchant, and the benefit to be applied to the transaction before performance of the task by the customer;
arrange for the customer to provide a security deposit; and
returning the security deposit to the customer based on the performance task.

29. The apparatus of claim 28, further comprising:
a communication device coupled to said processor and adapted to communicate with at least one of: (i) a customer device, (ii) a controller, (iii) a merchant device, (iv) a subsidy provider device, (v) a benefit provider device, (vi) an escrow service device, and (vii) a payment device.

30. The apparatus of claim 28, wherein said storage device further stores at least one of: (i) a customer database, (ii) a task database, (iii) a rebate certificate database, and (iv) a rebate code database.

31. A medium storing instructions adapted to be executed by a processor to perform a method for facilitating a transaction between a customer and a merchant, said method comprising:
arranging, via a computing device, for a benefit to be applied to the transaction in exchange for a future performance of a task by the customer, the task being associated with a party other than the merchant and wherein the task does not comprise a return of a product, and the benefit to be applied to the transaction before performance of the task by the customer;
arranging for the customer to provide a security deposit; and
returning the security deposit to the customer based on the performance task.

32. A method comprising:
receiving an indication a customer is interested in purchasing an item from a merchant;
based on the received indication, transmitting to the customer via a processing device an offer to apply a benefit, provided by a subsidy provider other than the merchant, to a purchase of the item in exchange for a future performance of a task by the customer;
receiving a payment identifier from the customer;
arranging for the customer to provide payment of a security deposit using the payment identifier;
before verifying performance of the task by the customer, applying the benefit to the purchase;
verifying the performance of the task by the customer; and
returning the security deposit to the customer based on the performance task.

33. A method comprising:
receiving, from a customer, a security deposit to secure a benefit provided by a merchant, wherein the benefit comprises a monetary amount equivalent to the security deposit;
after receiving the security deposit from the customer, providing the benefit to the customer in exchange for a task to be performed by the customer after the customer receives the benefit, the task being associated with a party other than the merchant;
after providing the benefit to the customer, receiving, via a processing device, information indicating that the customer has performed the task; and
after receiving the information, returning the security deposit to the customer.

34. A computer readable medium storing instructions for facilitating a transaction between a customer and a merchant, the instructions configured to direct a processor to:

receive an indication a customer is interested in purchasing an item from a merchant;

based on the received indication, transmit to the customer via a processing device an offer to apply a benefit, provided by a subsidy provider other than the merchant, to a purchase of the item in exchange for a future performance of a task by the customer;

receive a payment identifier from the customer;

arrange for the customer to provide payment of a security deposit using the payment identifier;

before verifying performance of the task by the customer, apply the benefit to the purchase;

verify the performance of the task by the customer; and return the security deposit to the customer based on the performance of the task.

35. An apparatus for facilitating a transaction between a customer and a merchant, comprising:

a processor; and a storage device coupled to said processor and storing instructions adapted to be executed by said processor to:

receive an indication a customer is interested in purchasing an item from a merchant;

based on the received indication, transmit to the customer via a processing device an offer to apply a benefit, provided by a subsidy provider other than the merchant, to a purchase of the item in exchange for a future performance of a task by the customer;

receive a payment identifier from the customer;

arrange for the customer to provide payment of a security deposit using the payment identifier;

before verifying performance of the task by the customer, apply the benefit to the purchase;

verify the performance of the task by the customer; and return the security deposit to the customer based on the performance of the task.

36. A computer readable medium storing instructions for facilitating a transaction between a customer and a merchant, the instructions configured to direct a processor to:

receive, from a customer, a security deposit to secure a benefit provided by a merchant, wherein the benefit comprises a monetary amount equivalent to the security deposit;

after receiving the security deposit from the customer, provide the benefit to the customer in exchange for a task to be performed by the customer after the customer receives the benefit, the task being associated with a party other than the merchant;

after providing the benefit to the customer, receive, via a processing device, information indicating that the customer has performed the task; and after receiving the information, return the security deposit to the customer.

37. An apparatus for facilitating a transaction between a customer and a merchant, comprising:

a processor; and a storage device coupled to said processor and storing instructions adapted to be executed by said processor to:

receive, from a customer, a security deposit to secure a benefit provided by a merchant, wherein the benefit comprises a monetary amount equivalent to the security deposit;

after receiving the security deposit from the customer, provide the benefit to the customer in exchange for a task to be performed by the customer after the customer receives the benefit, the task being associated with a party other than the merchant;

after providing the benefit to the customer, receive, via a processing device, information indicating that the customer has performed the task; and after receiving the information, return the security deposit to the customer.

* * * * *